United States Patent
Hanneken

(10) Patent No.: US 8,973,640 B1
(45) Date of Patent: Mar. 10, 2015

(54) DEMOUNT TOOL ASSEMBLY AND METHODS FOR AUTOMATED TIRE CHANGER MACHINE

(75) Inventor: Douglas S. Hanneken, St. Louis, MO (US)

(73) Assignee: Hunter Engineering Company, St. Louis, MO (US)

( * ) Notice: Subject to any disclaimer, the term of this patent is extended or adjusted under 35 U.S.C. 154(b) by 487 days.

(21) Appl. No.: 13/312,581

(22) Filed: Dec. 6, 2011

Related U.S. Application Data

(60) Provisional application No. 61/420,543, filed on Dec. 7, 2010, provisional application No. 61/483,297, filed on May 6, 2011.

(51) Int. Cl.
- *B60C 25/135* (2006.01)
- *B60C 25/132* (2006.01)
- *B60C 25/138* (2006.01)
- *B60C 25/05* (2006.01)

(52) U.S. Cl.
CPC .......... *B60C 25/138* (2013.01); *B60C 25/0506* (2013.01); *B60C 25/0584* (2013.01)
USPC .......................... 157/1.17; 157/1.24; 157/1.22

(58) Field of Classification Search
CPC ............ B60C 25/0506; B60C 25/0584; B60C 25/0578; B60C 25/138; B60C 25/125; B60C 25/13; B60C 25/05
USPC ................. 157/1.24, 1.17, 1.22, 1.3
See application file for complete search history.

(56) References Cited

U.S. PATENT DOCUMENTS

| | | | |
|---|---|---|---|
| 4,436,134 A | 3/1984 | Gaither | |
| 6,240,994 B1 | 6/2001 | Schmitt | |
| 6,619,362 B2 | 9/2003 | Corghi | |
| 6,823,922 B2 | 11/2004 | Gonzaga | |
| 6,880,606 B2 | 4/2005 | Gonzaga | |
| 7,048,026 B2 | 5/2006 | Bonacini | |
| 7,128,119 B2 | 10/2006 | Corghi | |
| 7,455,096 B2 | 11/2008 | Bonacini | |
| 7,497,761 B2 | 3/2009 | Gonzaga | |
| 8,291,958 B2 | 10/2012 | Bartoli | |
| 8,307,874 B1 | 11/2012 | Hanneken et al. | |
| 2002/0162633 A1 | 11/2002 | Mimura | |
| 2006/0254725 A1* | 11/2006 | Gonzaga | 157/1.17 |
| 2008/0179014 A1 | 7/2008 | Sotgiu | |
| 2009/0266494 A1 | 10/2009 | Sotgiu | |
| 2010/0089538 A1 | 4/2010 | Bonacini | |
| 2010/0243173 A1* | 9/2010 | Bartoli | 157/1.24 |

(Continued)

FOREIGN PATENT DOCUMENTS

| | | |
|---|---|---|
| EP | 2233325 A1 | 9/2010 |
| EP | 2174807 B1 | 10/2011 |
| EP | 2599648 A1 | 6/2013 |

(Continued)

*Primary Examiner* — Bryan R Muller
(74) *Attorney, Agent, or Firm* — Armstrong Teasdale LLP

(57) ABSTRACT

A tire changer machine and tire demounting methodology includes a demount tool assembly having a demount tool selectively positionable relative to a support and configured to extract a bead of the tire from the wheel rim. A guide element is mounted to the support, and the guide element is operable to provide a limited degree of freedom of the distal end from a predetermined path of motion in a tire demount procedure, thereby allowing the distal end to reliably grip the tire bead while the support arm is maintained in a stationary position relative to the wheel rim.

24 Claims, 18 Drawing Sheets

(56) References Cited

U.S. PATENT DOCUMENTS

2012/0291959 A1* 11/2012 Gonzaga et al. ............... 157/1.3
2013/0139973 A1 6/2013 Bonacini

FOREIGN PATENT DOCUMENTS

| GB | 575558 | 2/1946 |
| GB | 1056296 | 1/1967 |

* cited by examiner

… (continued)

DEMOUNT TOOL ASSEMBLY AND METHODS FOR AUTOMATED TIRE CHANGER MACHINE

CROSS REFERENCE TO RELATED APPLICATIONS

This application claims the benefit of U.S. Provisional Application Ser. No. 61/420,543 filed Dec. 7, 2010 and U.S. Provisional Application Ser. No. 61/483,297 filed May 6, 2011, the disclosures of which are hereby incorporated by reference in their entirety.

BACKGROUND OF THE INVENTION

The field of the invention relates generally to tire changer machines, and more specifically to tire changer machines having improved demount tools for automatically changing tires on a wheel rim.

The process of removing a tire from a wheel rim and replacing it with another tire, referred to herein as tire changing, can be difficult. In response to such difficulties, machines have been developed to facilitate the tire changing process. The machines commonly include a clamping mechanism and a drive assembly that rotates the wheel rim about an axis. A bead breaker tool exerts pressure on the tire adjacent the wheel rim to break the tire bead seal, and a tire removal tool, sometimes referred to as a demount tool, is used to pull the bead of the tire off the wheel rim as the wheel rim is rotated, allowing the tire to be separated from the rim for removal. Manual or machine implemented tools are also utilized to press the tire onto the wheel rim for installation. While known machines have obtained some level of success in reducing the time and labor associated with changing a tire, there remains room for improvement.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
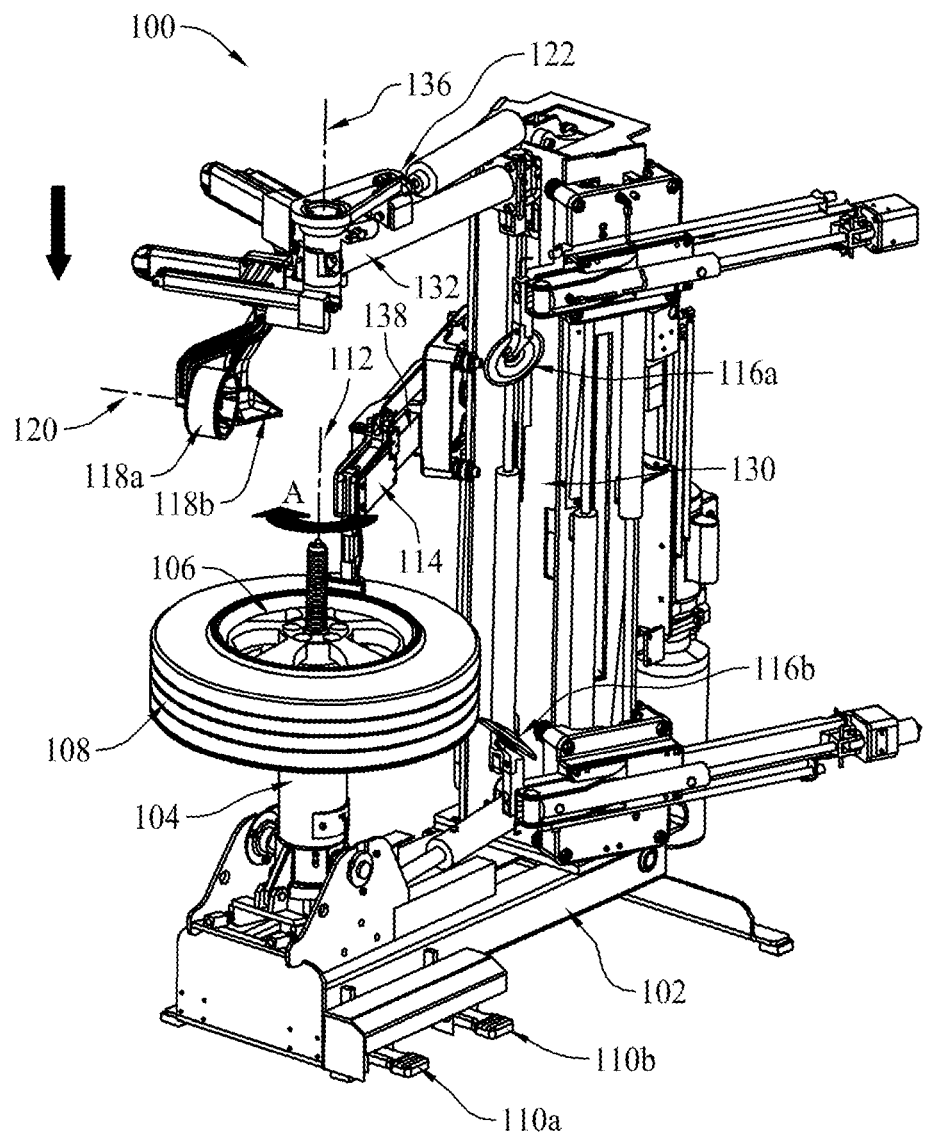
FIG. 1 is a perspective view of an exemplary embodiment of a tire changing machine.

Exemplary tire changer machines are disclosed herein below that overcome numerous difficulties and disadvantages in the art. In order to understand the invention to its fullest extent, some discussion of the state art and difficulties associated therewith is warranted. Accordingly, Part I below discusses the state of the art and associated problems and disadvantages, while Part II below describes exemplary embodiments of the invention and related methods that overcome difficulties and drawbacks of the state of the art.

PART I

State of the Art

Conventionally, tire changing machines have required manually operated hand tools, commonly referred to as levers, to extract tires from a wheel rim. The use of such levers required much effort and skill on the part of the machine operators to effectively remove a tire from a wheel rim without damaging the wheel rim. In today's marketplace involving a wide variety of wheel rims and tires, some of which are stiff walled and very difficult to change using levers, many tire changer machine manufacturers have sought to implement machine tools that render such lever tools unnecessary. A variety of tire demount tools exist for this purpose on modern tire changer machines. Such machines are sometimes referred to as "lever-less style" machines.

Several styles of lever-less tire changer machines are presently on the market. Tools provided on such lever-less machines typically tend to fall in one of four categories as described below.

A first category, referred to herein as Category 1, includes tire changer machines having separate mount and demount tools including a fixed position mounting geometry combined with a roto-translating demounting tool. The majority of presently available lever-less tire changer machines fall into this category, and U.S. Pat. No. 7,128,119 describes one example of such a machine. This Category 1 type of machine involves a demount tool, typically with some sort of a tire grabbing hook that follows a fixed and predefined path of motion while the demount tool is maintained in a stationary position relative to the wheel rim using geometrical features thereof. Because the demount tool hook can both rotate (i.e., pivot about a pivot point in the tool assembly) and translate (i.e., the pivot point can be moved along an actuator path) from a fixed starting position, rather complex movement of the demount tool during a tire demount procedure is possible. Such movement is sometimes referred to as roto-translational movement in the art, and can be beneficial because a simple actuator driving the demount tool can effect complex, curvilinear motion paths that would not otherwise be possible. The fixed path approach of Category 1 works well on certain types of tires, but has had limited success at hooking the tire bead on other types of tires in common use today. Accordingly, Category 1 machines have not completely met the needs of those in the art to effectively and efficiently change tires.

More specifically, the Category 1 fixed path approach is especially problematic on relatively common, high aspect ratio tires mounted on steel wheels in present day vehicles. Unreliable hooking of the tire bead with such tire and rim combinations tends to result in extra manual steps by the tire changer operator to take corrective action and complete a tire demounting procedure. Even for skillful machine operators, such corrective actions increase the time to demount a tire, and over a large number of tires a practical inability to reliably hook tire beads can result in significant labor costs and loss of efficiency in changing tires. Such complications requiring corrective action by operators also prevents such Category 1 tire changers from having completely automatic tire demounting routines.

A second category of lever-less machines, referred to herein as Category 2, includes tire changer machines wherein mount and demount geometries are combined into a single tool. An exemplary tool of this type is described in U.S. Provisional Patent Application No. 61/255,647 that is commonly owned with the present application. With such Category 2 tools, a portion of the tool may contact a lip of the wheel rim in an initial position and eventually follow an internal profile of the wheel rim as the demount procedure continues until a demount hook portion of the tool grabs the tire bead so that the tire can be extracted from the rim. Such Category 2 tools are perhaps advantaged in that they may follow a rim profile in an otherwise undefined path, and hence are capable of accommodating wheel rims having internal profiles that are problematic for the fixed path, Category 1 tools. Spring loaded pivoting segments may be provided with such Category 2 type tools to produce a roto-translational movement, similar to that described above for Category 1, that uses the actual rim profile as the guide in a tire demount procedure, and the tool is accordingly capable of relatively complex movement in a tire demount procedure.

As such, while a Category 2 type machine avoids the limitation of a pre-defined tool path common to Category 1 type machines, Category 2 type machines are nonetheless limited in their ability to reliably hook tire beads of high aspect ratio tires. This is because the mounting geometry of the tool that contacts the rim profile is axially spaced from the demount geometry that hooks the tire bead. That is, the demount hook geometry is not located at the distal end of the tool, but rather is spaced from the distal end. A "stand-off" condition tends to result that limits how close the hook geometry of the tool can be positioned relative to the rim in use. This can and sometimes does result in a situation where the tire bead becomes stuck underneath the hook without grabbing the tire bead. In such cases, manual intervention by the operator is necessary to reposition the tool until the tire bead can be hooked. Like Category 1, the Category 2 tools tend to require extra manual steps by the tire changer operator in the event of such complications while changing certain types of tires on certain types of rims. The resultant disadvantages are similar to those discussed above, including but not limited to preventing such tire changers from having completely automatic tire demounting routines.

A third category of lever-less tire machines, referred to herein as Category 3, involves a rotating hook that is operable to grip a tire bead after the hook is located in a start position by an operator. Such an arrangement is described, for example, in U.S. Patent Application Publication No. 2009/0266494. Once the tool is positioned in proximity to the rim drop center, which is typically accomplished manually by the operator, the hook is simply rotated so as to catch the tire bead. Such rotating hooks of Category 3 type machines avoid problematic "stand-off" issues of Category 2 type machines, but rely heavily on accurate placement of the hook by an operator prior to rotation. If the hook is not accurately placed prior to rotation, the rotating hook is unlikely to grab the tire bead, and some trial and error with additional steps to complete a demount operation is not uncommon for machine operators using Category 3 type machines. Wide variations in wheel rims also make such rotational hooks of Category 3 type machines difficult to implement in an automatic mode of operation.

The fourth category of lever-less machines, referred to herein as Category 4, involves a rigid hook tool that requires manual placement by the operator to hook the bead with the rigid tool. In such machines, the operator must direct every movement of the tool, typically in vertical and horizontal directions with no ability to rotate the hook, to perform a tire demount a tire. While usually effective to successfully extract a tire from a wheel rim, the manual positioning required by Category 4 machines tends to be slow and cumbersome for most machine operators, and except for very skilled operators, tends to resolve some degree of trial and error to successfully complete a tire demount procedure. Automated positioning of such tools in Category 4 machines requires either prior knowledge of the rim profile, which tends to be impractical given the large variety of wheel rims now in use, or slow and expensive rim scanning technology that is difficult to implement.

It would be desirable to provide a tire machine having tools that are less reliant on operator skill, more amenable to automation, and more reliable to effectively demount tires from wheel rims, including but not limited to high aspect ratio tires that cause great difficulties for known tire changer machines.

PART II

Inventive Tire Changer Machines, Tool Assemblies and Methods for Demounting Tires Exemplary embodiments of tire changer machines and tool assemblies therefore are described below that overcome the difficulties and disadvantages explained below. Method aspects will be in part apparent and in part specifically discussed in the disclosure below.

FIG. 1 illustrates an exemplary tire changing machine 100 including a frame or base 102 and a rotatable drive shaft assembly 104 attached to the base 102. The drive shaft assembly 104 may include a post or shaft positioned centrally on the base 102, and the shaft is adapted to receive and retain a wheel rim 106 having a tire 108. The wheel rim 106 may be secured to the drive shaft assembly 104 with a clamping mechanism after the wheel rim 106 and tire 108 is loaded and mounted onto the machine 100. In an exemplary embodiment, the clamping mechanism may be as described in the commonly owned U.S. patent application Ser. No. 12/358,760 filed Jan. 23, 2009, the disclosure of which is hereby incorporated by reference. In other embodiments, alternative clamping mechanisms known in the art may be utilized.

After the wheel rim 106 is clamped in position, a machine operator manipulates an input selector 110a which operates the drive shaft assembly 104 to rotate the wheel rim 106 and tire 108 about a drive axis 112. In different exemplary embodiments, the drive shaft assembly 104 may be pneumatically or hydraulically actuated or powered electrically. In another embodiment, a rotating turntable or other mechanism may be provided in lieu of the drive shaft assembly 104. Clockwise and counterclockwise rotation about the axis 112, indicated by the arrow A, are possible in different embodiments.

While the drive axis 112 is illustrated as being generally vertical in the embodiment depicted, the axis 112 may be oriented horizontally or otherwise in other embodiments, and the axis 112 may be selectively positionable in different positions relative to the base 102.

As the wheel rim 106 is rotated about the axis 112 as shown by arrow A, a tool assembly 114 may be brought into physical contact or engagement with the tire 108 in the direction of arrow B at respective locations proximate an outer periphery of the rim 106. With the tool assembly 114 in the proper position with respect to the tire 108 and wheel rim 106, the tire 108 and wheel rim 106 are rotated about the axis 112 in the clockwise or counterclockwise direction of arrow A with the tool assembly 114 engaged to the tire 108 to demount the tire 108 as explained below. Additionally, the tool assembly 114 may be utilized to mount a tire 108 to the wheel rim 106.

The tool assembly 114, as further described below may include features to separate or displace an inner circumference of the tire 108 including the bead 200 over the outer lip of the wheel rim 106 to remove the tire 108, or to engage the inner circumference of the tire 108 including the bead 118 on the outer lip 202 of the wheel rim 106 to install the tire 108. The tire 108 may be appropriately lubricated to facilitate easier removal and installation using the tool assembly 114.

Machine tools 116a, 116b are provided, and sometimes referred to as bead breaker tools that exert pressure on the tire 108 to either break the tire bead seal with the rim 106 or push or displace the inner circumference of the tire 108 over the outer lip of the wheel rim 106 to install the tire 108. As shown in the exemplary embodiment in FIG. 1, two tools 116a and 116b are shown, one located above the tire 108 and the other located below the tire 108. In another embodiment, a single bead breaker tool 116 could be provided.

Machine tools 118a and 118b are also provided and sometimes are referred to as pressing tools, pusher tools, or bead pressing devices. As shown in the exemplary embodiment in FIG. 1, bead pressing devices 118a, 118b are shown that exert pressure on the tire sidewall in tire mounting and demounting procedures. In the exemplary embodiment shown differently configured bead pressing devices 118a and 118b are shown.

The bead pressing device 118a, is a roller device that is mounted for rotation about an axis 120 that is substantially perpendicular to the machine drive axis 112. Thus, when the roller device 118a is placed in contact with the tire sidewall, it may rotate about the axis 120 as the tire 108 is rotated about the machine drive axis 112 while the device 118a remains in a fixed position relative to the machine drive axis 112. When desired, the roller device 118a is also operable wherein it may rotate in tandem with the tire 108 about the drive axis 112.

The bead pressing device 118b is adapted for contact with the tire 108 and includes a frictional engagement surface to facilitate movement relative to the tire. When engaged to the tire sidewall, the pressing device 118b rotates about the drive axis 112 with the tire 108. Optionally the pressing device 118b may incorporate a feature that engages a spoke, a hole, or other feature of the wheel rim 106 to ensure that the pressing device 118b (and also the tire 108 with which it is engaged) rotates along with the wheel rim 106 and that the pressing device 118b does not move relative to the wheel rim 106. Alternatively, the pressing device 118b may optionally be coupled with an independent drive mechanism 122 that pushes the bead pressing device 118b and the tire 108 in the direction of rim rotation about the drive axis 112. This is sometimes referred to as establishing a "traction point" in addition to pushing the tire bead into the drop center of the wheel rim 106 when mounting the tire 108.

The pressing tools 118a, 118b may be spaced from one another to maintain the tire bead in the drop center 203 of the wheel rim 106 during tire demounting procedures, or to push the tire bead into the drop center in a tire mounting procedure. While two bead pressing devices 118a and 118b are shown in FIG. 1, additional bead pressing devices 118 may be provided. Two or more bead pressing devices 118 are beneficial for mounting or demounting larger diameter tires and stiffer tires, although it is understood that in some cases a single bead pressing device 118 may be sufficient to mount or demount certain types of tires.

The tool assembly 114, and the tools 116, 118 serve to supply sufficient tire insertion or removal forces at the correct angle and location with respect to the tire 108 such that the bead 118 of the tire 108 is forced out of or onto a bead seat on the wheel rim 106. While exemplary tools 116, 118 are illustrated in combination with the tool assembly 114, still other tire changing tools and devices may be provided and used for bead breaking, tire mounting and/or demounting, locating a valve stem, locating a wheel weight, locating a wheel sensor such as a Tire Pressure Monitoring System (TPMS) sensor, or other purposes. Such other tools may be provided in addition to or in lieu of the tools 116, 118 as depicted.

To assist with locating the tool assembly 114 and the tools 116, 118 a sensory capability may further be provided in the machine 100 to detect a position of the tool assembly 114 and the tools 116, 118 (or perhaps other tools that may be provided) with respect to the tire 108 and/or wheel rim 106. For example, one known tire changing machine includes a switch mechanism that changes state when the bead breaker tool moves just beyond the outer edge of the rim, ensuring that the bead breaker is positioned to engage a tire at a predetermined location. Machine vision systems are also known that help align the machine tools with respect to the wheel rim at predetermined locations. As another example, force feedback sensors may be integrated as further monitoring and control features for the machine components, including but not limited to the machine tools, in use. While such sensory capabilities may be beneficial, in some embodiments they may be considered optional and accordingly not be utilized.

The exemplary machine 100 as shown also includes a support tower 130 extending from the base 102 at a location spaced from the drive assembly 104, and the support tower 130 extends to a height well above the tire 108 and rim 106. A linkage 132 extends outwardly from the support tower 130, and the pressing tools 118a, 118b are coupled to the linkage 132. The linkage 132 is movable by an actuator on the support tower 130 in a direction parallel to arrow B in FIG. 1, such that as the linkage 132 is moved, the bead pressing devices carried on the linkage 132 are moved toward or away from the tire 108. As such, the bead pressing devices 118a, 118b may be moved in a direction parallel to the machine drive axis 112.

Also, the bead pressing devices 118a, 118b are mounted to the linkage 132 such that they are rotatable about an axis 136 that is fixed and coincident with the machine drive axis 112 in a tire change procedure. That is, the pressing devices 118 are rotatable about the axis 136 that is coaxial with the machine drive axis 112. As such, because the axis 136 is coincident with the drive axis 112, when the bead pressing devices 118 are in contact with the tire 108, the bead pressing devices 118 may rotate with the tire 108 as it is rotated about the drive axis 112. Unlike conventional tire changing machines, including but not limited to so-called swing-arm style machines, the rotational axis 136 for the pressing devices 118 is fixed at a set distance and location from the tower support frame 130 in an exemplary embodiment. A more compact machine arrangement and work area is therefore provided compared to some conventional machines.

While locating the rotation axis 136 of the pressing devices 118 at a fixed and set distance and location from the tower support frame 130 can be beneficial for the reasons stated, it is recognized that in further and/or alternative embodiments neither the location of the drive axis 112 nor the rotational axis 136 for the pressing devices need necessarily be fixed in such a manner so long as the axes 112 and 136 are positionable to become coincident when the pressing devices 118 are needed. That is, either or both of the axes 112 and 136 may be movable to different operating positions, distances and orientations relative to each other and relative to the tower support frame 130 for reasons not pertinent to use of the pressing devices 118a, 118b, but when the pressing devices 118a, 118b are to be engaged to the tire, the axes 112 and 136 are moved to become coincident once again so that the bead pressing devices 118 may rotate with the tire 108 about the drive axis 112.

The bead pressing devices 118a, 118b are further movable in a direction perpendicular to the axis 136 and the drive axis 112. That is, actuators are provided that move the bead pressing devices 118a, 118b toward and away from the drive axis 112, such that the bead pressing devices 118 may be manually or automatically adjusted to different radial positions measured from the drive axis 112 to accommodate tires and rims of different diameters. The bead pressing devices 118 may also be manually or automatically positioned in the direction perpendicular to the drive axis 112 as described below.

The bead breaker tools 116a, 116b are also coupled to and supported by the tower support frame 130 (or other support structure in an alternative embodiment) via linkages that also movable in vertical and horizontal directions to position the bead breaker tools 116a, 116b relative to the wheel rim 106 and tire 108 for use.

The tool assembly 114 is likewise coupled to a support 138 and associated linkages on the tower support frame 130, such that the support 138 is movable relative to the tower support frame 130 with actuators in vertical and horizontal directions. As such, the tool assembly 114 is movable toward and away from the drive axis 112 in a radial direction, and toward and away from the tire 108 and wheel rim 106 in a direction parallel to arrow B. The tool assembly 114 in the illustrated embodiment is independently positionable from the tools 116, 118, although it is understood that the assembly 114 and the tools 116, 118 may be used in concert while changing the tire 108. Also, while the tool assembly 114 and the tools 116, 118 are all coupled to the same tower support frame 130 in the exemplary embodiment depicted, they could alternatively be supported with independent support frames and structure that is separately provided on the machine 100 in view of a single tower support frame 130.

The positions of the tool assembly 114 and the tools 116, 118, and operation of the drive assembly 104 and other features of the machine 100 may be coordinated by a control unit that may include a controller (discussed below) and actuator components operatively connected to the controller.

A machine operator may manipulate input selectors 110a, and 110b, for example, which communicate with the control unit to move the tool assembly 114, and the tools 116, 118 to desired positions and/or to operate the drive assembly 104 or activate other machine features. In illustrative embodiments, the input selectors 110a, 110b may be foot pedals located near the bottom of the machine base 102 for convenient use of the machine operator(s). In other embodiments, other known input selectors, including but not limited to levers, buttons, knobs, switches, joysticks, and touch sensitive screens may be employed in various locations on or near the machine 100. An operator station including a display and an input device including a keyboard or other input selectors may be optionally provided for the benefit of the operator. Still other features of the machine may be provided, such as tire inflation systems and the like familiar to those in the art.

Figure 2:
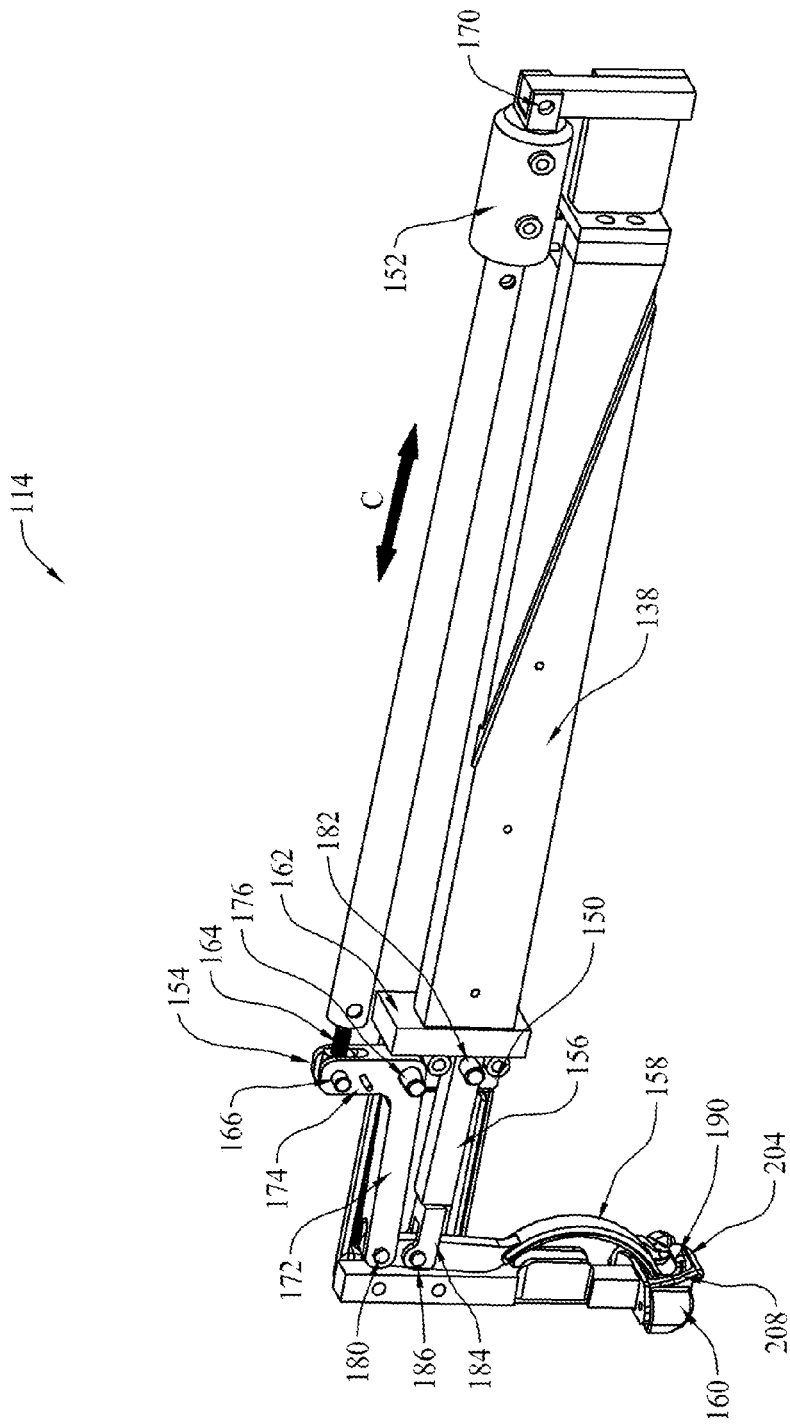
FIG. 2 is a front perspective view of an exemplary demount tool assembly for the machine shown in FIG. 1.
Figure 3:
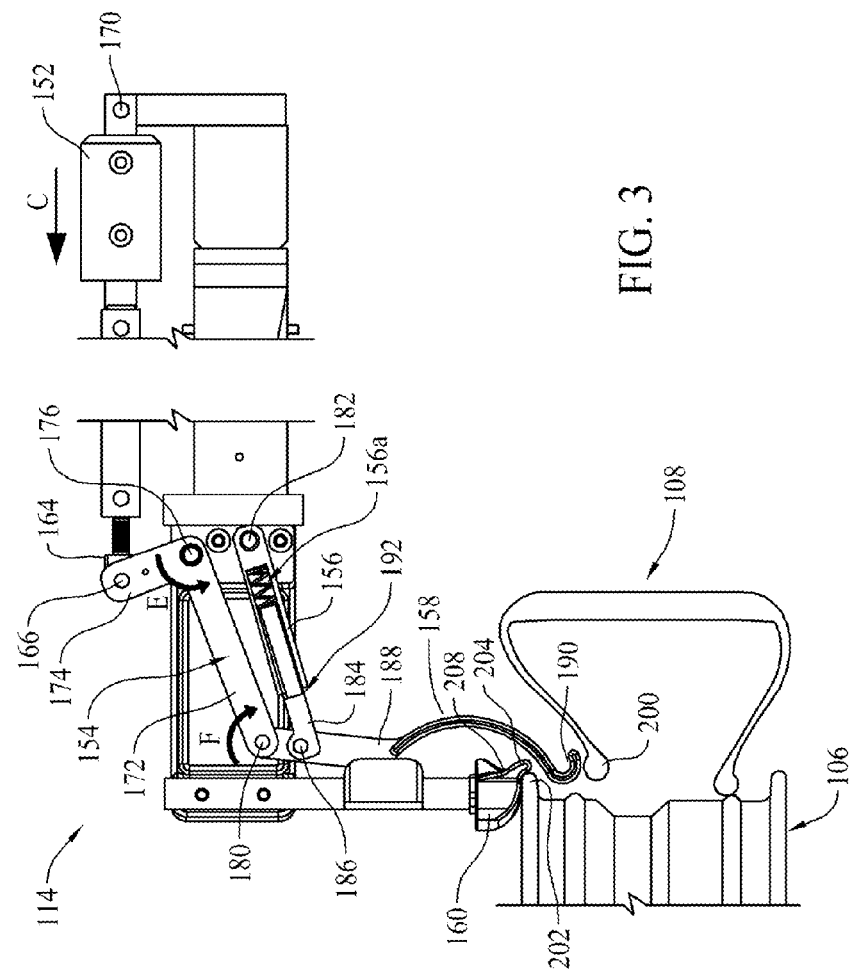
FIG. 3 illustrates the demount tool assembly shown in FIG. 2 in a first operating position in a tire demount procedure.

Turning now to FIGS. 2 and 3, the tool assembly 114 includes a support base plate 150, an actuator 152 coupled to the support 138, a pivot arm 154, a guide element 156, and a demount tool 158. A wheel mount head 160 extends from and is mounted stationary to the support plate 150. The wheel mount head 160 is configured to locate the tool assembly 114 in proper position relative the wheel rim 106 and tire 108 in a demount procedure, and in some embodiments is configured to physically contact the wheel rim 106 to perform a tire mount procedure and a tire demount procedure as explained in more detail below. The demount tool 158 is extendable and retractable relative to the support plate 150, and also the wheel mount head 160 as explained below.

The support base plate 150 is mountable to the frame support 138 (FIG. 1 and FIGS. 4-7) on the machine 100 via a mounting section 162 using fasteners (not shown) or by other techniques, such that the support base plate 150 is mounted stationary to the frame support 138. As such, when the support frame 138 is moved, the support base plate 150 is moveable with it to position the tool assembly 114 toward and away from the wheel rim 106 and tire 108 (FIG. 1) when the wheel rim 106 and tire 108 are mounted to the drive assembly 104. While a generally rectangular support base plate 150 is shown, it is recognized that supports of other shapes, whether or not plates, could likewise be used in other embodiments with equal effect.

The actuator 152, as best shown in FIG. 2, is a linear actuator movable along an axis in the direction of arrow C. In the example shown in FIG. 2, the actuator 152 is mounted substantially horizontal above the support frame 138, such that its axis of motion (indicated by Arrow C) is substantially perpendicular to the drive axis 112 (FIG. 1) of the machine 100. A distal end of the actuator is provided with a coupler 164 establishing a first pivot point 166 with a link 154. A second pivot point 170 is established at the opposing end of the actuator 152.

The pivot arm 154 includes an elongated longitudinal portion 172 having a first axial length and a lateral portion 174 of a second, and shorter, axial length than the longitudinal portion 172. The longitudinal and lateral portions 172 and 174 further extend generally perpendicular to one another, and as shown in the exemplary embodiment of FIG. 2 the arrangement of the portions 172 and 174 imparts a generally L-shaped profile to the pivot arm 154. The pivot arm 154 is attached to the support plate 150 at a pivot point 176 such that the arm 154 can rotate thereabout. While in the illustrated embodiment the pivot point 176 is approximately at the intersection of the longitudinal and lateral portions 172, 174, other arrangements are possible in alternative embodiments.

In the illustrative embodiment shown in FIG. 2, the pivot arm 154 is mounted to a side of support plate 150 and the lateral portion 174 of the pivot arm 150 extends above the plate in a generally vertical direction that is substantially parallel to the machine drive axis 112. The longitudinal portion 172 accordingly extends in a direction generally perpendicular to the machine drive axis 112.

A pivot 166 interconnects the actuator coupler 164 and the distal end of the pivot arm lateral portion 174. The distal end of the pivot arm longitudinal portion 172 establishes a pivot point 180 that causes the demount tool 158 to extend and retract as explained below.

The guide element 156 is mounted to the plate 150 at a pivot point 182 at one end thereof, and the opposing end of the guide element 156 is provided with a coupler 184 establishing a pivot point 186 that is attached, in turn to the demount tool 158. The guide element 156 has an axial length that is set at an angle relative to the pivot arm longitudinal portion 174 in the position shown in FIG. 2, which is also depicted in side elevation view in FIG. 6.

The demount tool 158 further includes, as shown in FIG. 3, a proximal end 188 and a distal end 190. The proximal end 188 is rotatably mounted to the pivot arm 154 and to the guide element 156 at the respective pivot points 180 and 186. The distal end 190 that opposes the proximal end 188 is shaped as a curved hook that depends from the proximal end 188. The curved distal end 190 forming the hook extends from a curved body 191 having a much larger radius of curvature than the distal end 190, and also opposite curvature to the distal end 190. Thus, the body 191 imparts a bowed or arch-like shape having a convex curvature from the view of FIG. 2, while the distal end 190 has a more abrupt and concave curvature imparting a hook like extremity at the distal end 190.

As illustrated in FIG. 3, when the actuator 152 is actuated, the pivot point 166 at the actuator end is moved in the direction of arrow C which causes the pivot arm 154 to swing about the pivot point 176 in the direction of Arrow E. As the pivot arm 154 swings, the proximal end 188 of the demount tool 158 is caused to move via the pivot point 180 in the direction of arrow F, and the pivot point 186 (also established at the proximal end 188 of the demount tool) provides a limited degree of freedom of the distal end 190 to move from an otherwise predetermined path of motion in a tire demount procedure as further described below. The limited freedom of movement provided by the guide link 156 allows the distal end 190 of the demount tool 158 to reliably grip a tire bead 200 (FIGS. 4-7) while the support plate 150 is maintained in a stationary position relative to the wheel rim 106.

In an exemplary embodiment, the guide element 156 is at least partly compliant to provide the limited degree of freedom of movement of the distal end 190 of the demount tool 158. As one example, the guide element 156 may be a spring loaded linear link as shown. That is, the guide element link 156 may be provided with an internal spring element, 156a, that interfaces the link 156 with the coupler 184 that connects to the demount tool distal end 190. As such, the combined link 156 and coupler 184 may have a variable axial length. Specifically, when the proximal end 188 of the demount tool 158 is pivoted at the pivot point 180 by the pivot arm 154 as the actuator 152 is extended, the spring element is compressed and the axial length is decreased. However, when the proximal end 188 of the demount tool 158 is pivoted at the pivot point 180 by the pivot arm 154 as the actuator 152 is retracted, the spring is relaxed and the axial length is increased.

The ability of the spring to increase or decrease the axial length in such a manner is limited by a predetermined separation, gap or clearance 192 between the opposing and facing ends of the link 156 and the mating coupler 184. Because the link 156 and the coupler 184 are rigid elements, when the gap 192 is closed the ends of the link 156 and coupler 184 are brought into physical contact. The spring reaches a maximum compression at this point and the spring becomes mechanically isolated in such circumstances. Thus, as the proximal end 188 of the demount tool 158 continues to be rotated past the point where the gap 192 is closed, the link 156 and coupler 184 essentially act as one rigid element having a minimum axial length.

The guide element link 156 is therefore operable in two distinct modes. Where the gap 192 is not closed, the link 156 and coupler 184 are operable in a compliant mode where the spring is compressed or relaxed depending on the direction of rotation of the demount tool proximal end 188. In the compliant mode the axial length can be shortened or lengthened as described above.

Where the gap 192 has been closed, the link 156 operates in the rigid mode. In the rigid mode, the spring can neither be compressed or relaxed, and the axial length of the combined link 156 and coupler 184 remains constant. It should be noted that the rigid mode of operation is dictated by physical properties of the tire 108 and the wheel rim 106 as the tool assembly is utilized, and not operator preference. That is, the link 156 switches between the compliant mode and the rigid mode without operator input, or perhaps even without the operator's knowledge that the link has switched mode of operation.

In the compliant mode, the guide element link 156 operates to provide a limited degree of freedom of the distal end 190 of the demount tool 158 from an otherwise fixed path of motion in a tire demount procedure. That is, the link 156 allows the distal end 190 of the demount tool 158 a limited ability to deviate, where necessary, from the fixed path provided by the swinging pivot arm 154 at the point of attachment 180 to the proximal end 188. The distal end 190 can effectively and reliably grip the tire bead in wheel rim 106 and tire combinations that conventional lever-less machines cannot because the path of travel of the distal end 190 is not limited by a predefined, rigid path.

The wheel mount head 160 includes tire mount geometry that may be used to locate the tool assembly 114 relative to a wheel rim 106 and tire 108, and in some embodiments seats upon and physically touches or contacts an outer lip 202 (FIG. 3) of the wheel rim 106 in use. Circumferentially spaced apart locating fingers 204 (FIG. 2) depend downwardly from the wheel mount head 160. The finger 204 exerts pressure on the tire sidewall proximate the lip 202 in a demount procedure.

As best shown in FIGS. 2 and 4-8, the wheel mount head 160 defines a pocket 208 for the distal end 190 of the tire demount tool 158. Depending on the direction of movement of the actuator 152, the demount tool 158 can be selectively positioned between an extended position (FIGS. 4-6) relative to the wheel mount head 160 and a retracted position (FIGS. 2, 3, and 7) with the demount tool distal end 190 seated in the pocket 208. The pocket 208, as shown in the Figures, is rounded and defines a complementary surface to the rounded hook distal end 190. The pocket 208 also serves as a guide surface for launching and receiving the distal end demount tool 190 as it is extended and retracted.

FIGS. 4-8 illustrate aspects of the exemplary demount tool assembly 114 operating in a tire demount procedure. As can be seen in these figures, the actuator 152 and the linkage to the pivot arm 154 described above drive the pivot arm 154 to swing and move the proximal end 188 of the demount tool 158 along the predetermined path of motion dictated by the pivot arm 154, with the guide element link 156 accommodating a limited deviation of the proximal end 188 from the predetermined path as the distal end 190 engages the tire bead 200.

As the pivot arm 154 essentially creates a curved arcuate path of motion at the pivot point 180, which is imparted to the demount tool proximate end 188, the guide element 156 by virtue of the pivot point 186 also at the demount tool distal end 190, provides an additional and variable arcuate curved path of motion to the demount tool distal end 190. In combination, the curved paths by the two pivot points 180 and 186 at the demount tool distal end 190 afford a unique ability of the distal end 190 of the demount tool 158 to navigate to a position wherein it can reliably grip the tire bead 200 across a wide variety of tires without intervention by a human operator.

Advantageously, and because of the guide element link 156, a linear actuator 152 and the linkage described can produce complicated curved motion paths that may vary from demount procedure to demount procedure performed on different tire 108 and rim 106 combinations. The degree of compliance of the guide element link 156 can be varied to produce varying degrees of spring assisted action in hooking the tire beads, as well as the sensitivity of the guide element link 156 to switch from the compliant mode to the rigid mode.

Referring once again to FIG. 3, after a tire bead breaking procedure is performed using the machine tools 116 described above, for example, the tool assembly 114 is moved into position with actuators coupled to the support frame 138 of the machine 100 (FIG. 1) to position the assembly 114 radially relative to the machine drive axis 112, and also vertically relative to the tire 108. The wheel mount head 160 is, as shown in FIG. 3 placed in physical contact with the wheel rim 106, or in another embodiment is positioned very close to the position shown but physically spaced from the wheel rim lip 202 to establish a start position for a tire demount operation. The depending finger 204 of the wheel mount head 160 may, as mentioned above, act as a wedge in the starting position to press down on the tire 108 proximate the rim lip 202 and begin separating the tire side wall from the wheel rim lip 202 to allow tool access to the tire bead 200.

Once the start position is established, the wheel mount head 160 remains in place and does not move for the remainder of the demount procedure. The demount tool 158 may be extended from the pocket 208 in the wheel mount head 160 by operating the actuator 152 that causes the distal end 190 of the demount tool 158 to move as shown in FIG. 3. The hook shaped distal end 190 is guided out of the pocket 208 and becomes free to contact the tire side wall and provide further pressure to push the tire bead 200 toward the drop center 203 of the wheel rim 106.

As the proximal end 188 of the demount tool 158 is moved by the pivot arm 154, the spring in the guide element 156 begins to compress and the clearance 192 between the coupler 184 and the guide element link 156 decreases. Meanwhile, the link 156 is compliant and the demount tool distal end 190 is free to move somewhat in response to actual operating conditions, and is not necessarily forced to follow the path of the pivot arm 154 as established at the pivot point 180. In other words, because the link 156 is compliant, there is some flexibility in the actual operating position of the distal end 190 of the demount tool 158 relative to the tire bead 200. This mitigates, if not avoids, any chance that the tire bead 200 could become stuck under the distal end 190 of the demount tool 158 as has been experienced in conventional lever-less tire changer machines.

Figure 4:
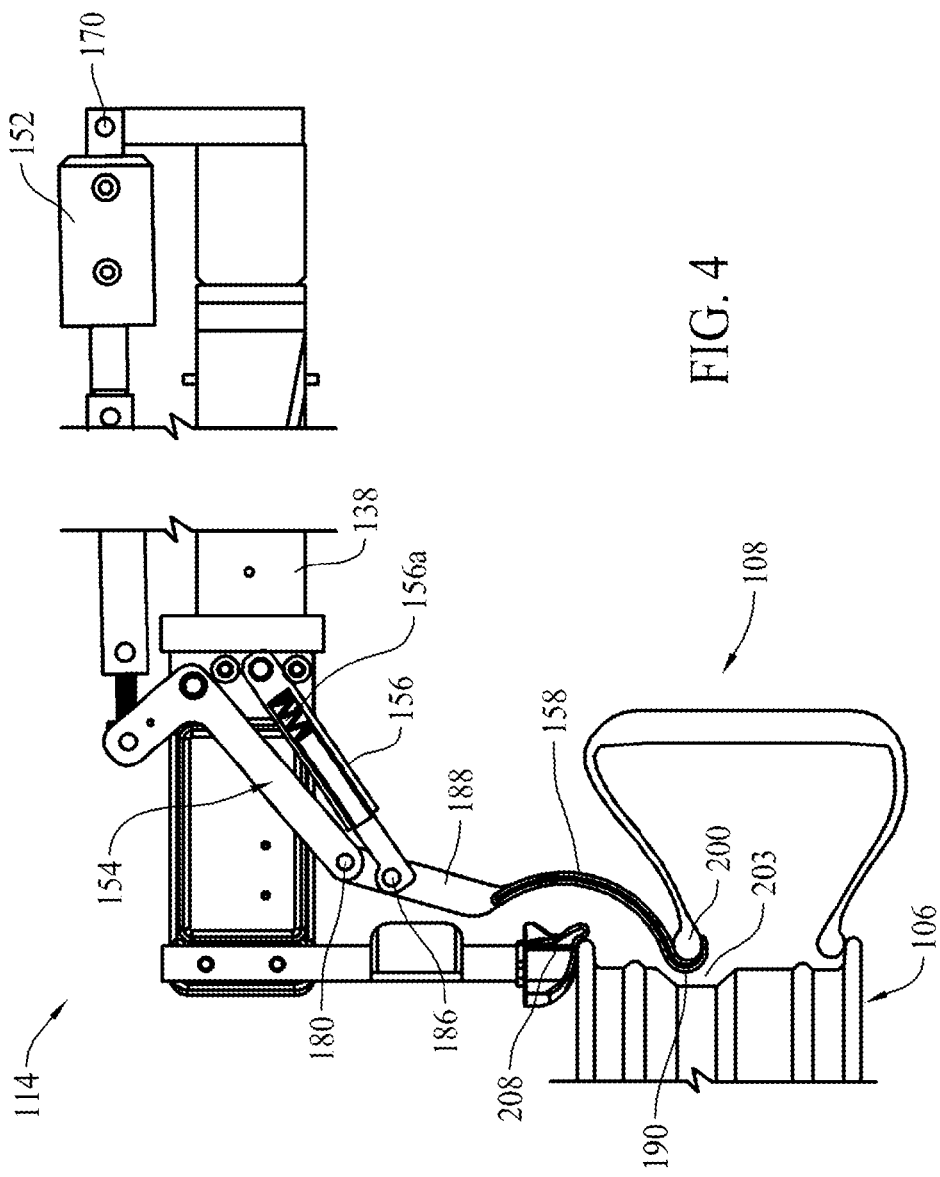
FIG. 4 illustrates the demount tool assembly in a second operating position in the tire demount procedure.

As shown in FIG. 4, as the pivot arm 154 continues to rotate, the distal end 190 of the demount tool 158 continues its descent into the drop center 203 of the wheel rim 106 where additional clearance is provided to allow the hook shaped distal end to grip the tire bead 200. The gap 192 of the guide element link 156 is nearly closed such that, if necessary, the rigid mode of operation can be entered to provide additional rigidity of movement of the distal end 190 to force the distal end 190 into position to engage the tire bead 202. It should be understood that whether or not the rigid mode will actually be entered will depend on the stiffness of the tire 108 being changed, the force constant of the spring in the link 156, and the initial size of the gap 192 between the guide link 156 and the coupler 184. These parameters can be strategically selected to achieve different effects in different embodiments. It is expected, however, that the rigid mode may not be necessary and need not be reached when changing certain types of tires, but will become necessary to effectively change other types of tires.

Figure 5:
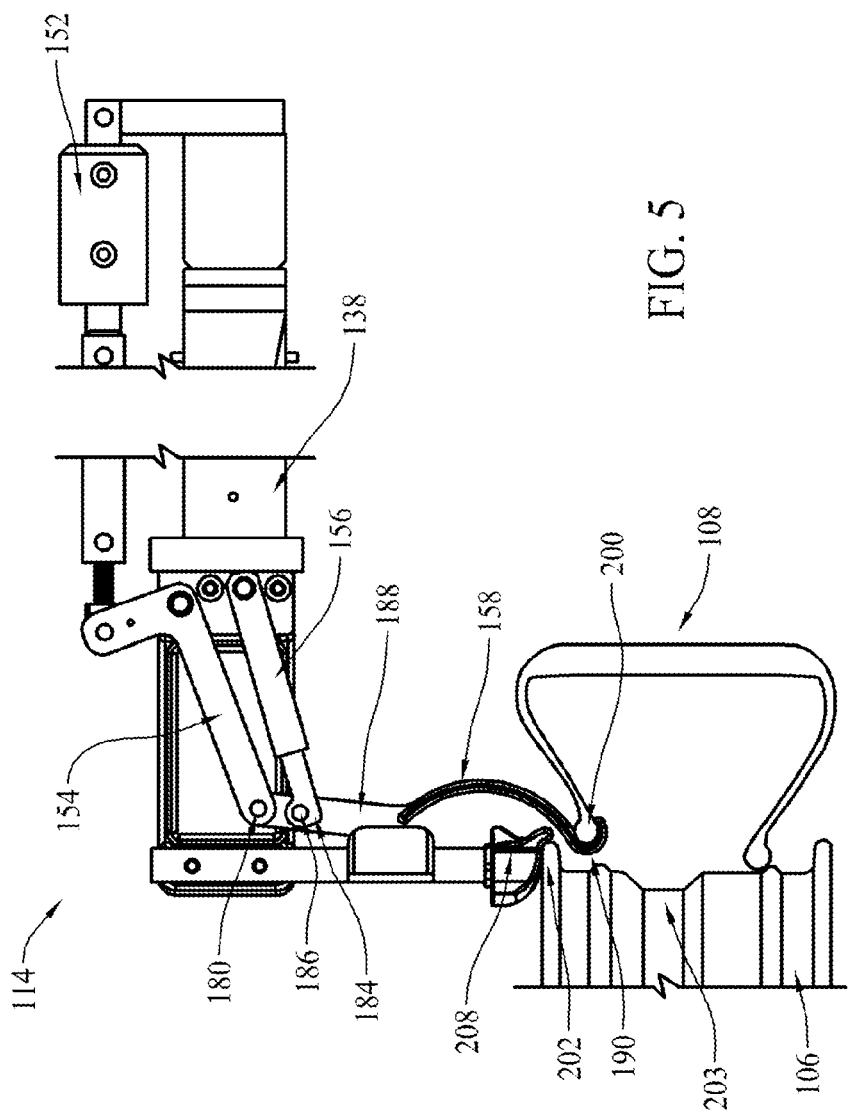
FIG. 5 illustrates the demount tool assembly in a third operating position in the tire demount procedure.

As shown in FIG. 5, the demount tool distal end 190 has gripped the tire bead 200 and the actuator 152 has been reversed to extract the tire bead 200 from the wheel rim 106. The demount tool 158 is being retracted back toward the pocket 208 in the wheel mount head 160, and is pulling the tire bead 200 back toward the rim lip 202. The curvature of the wheel mount head finger 204 and the demount tool 154 cooperate to provide a smooth gliding motion that gradually pulls the tire bead laterally away from the wheel rim 106 as the demount tool 158 ascends from the rim drop center.

Figure 6:
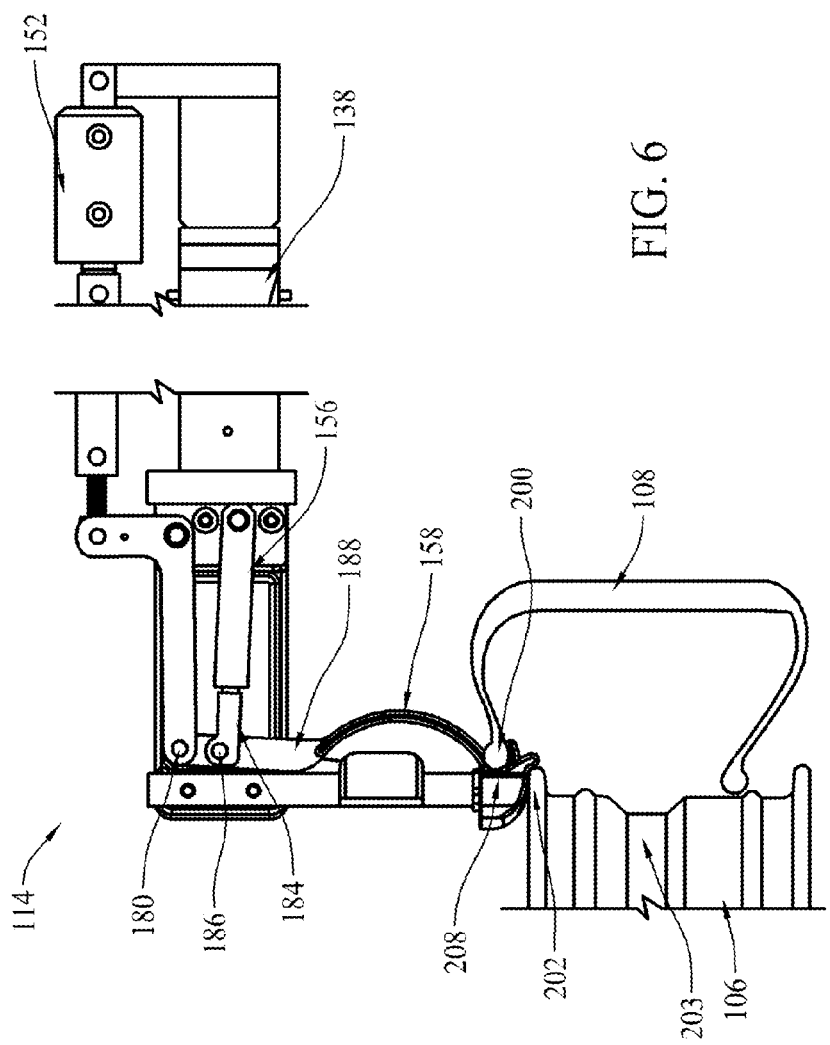
FIG. 6 illustrates the demount tool assembly in a fourth operating position in the tire demount procedure.

FIG. 6 shows the demount tool 158 fully retracted with the distal end 190 of the demount tool 158 in the pocket 208, and the tire bead 200 still engaged to the distal end 190. The tire bead 200 has been pulled over the rim lip 202. At this point, the wheel rim 106 can be rotated with the drive assembly 104 (FIG. 1) to extract the entire circumference of the tire bead 200 from the wheel rim 106 where the tire 108 is disengaged from the rim 106 and can easily be removed.

Figure 7:
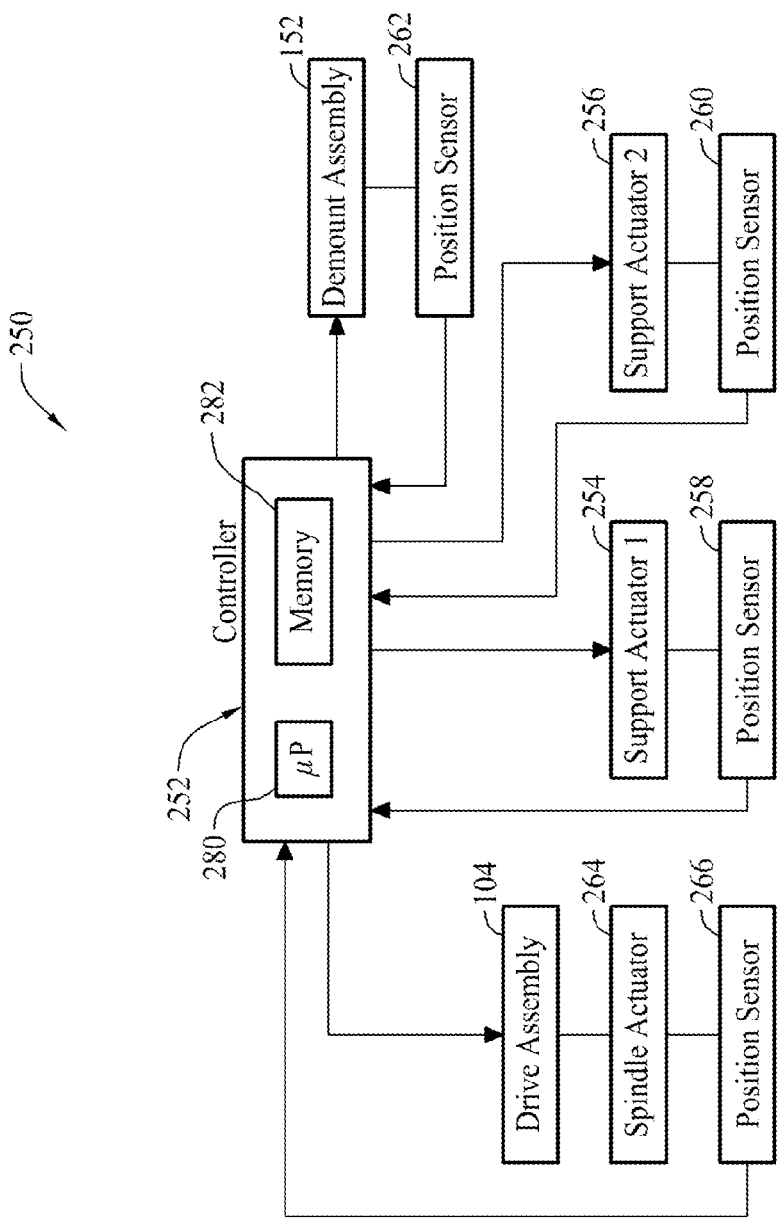
FIG. 7 is a block diagram of a control system for the machine shown in FIG. 1 including the demount tool assembly.

FIG. 7 schematically illustrates an exemplary control system 250 that may be implemented in the machine 100 for more optimal use and control of the machine 100 to change tires, and specifically to demount tires as described above. Using the control system 250, tire demount procedures can be entirely automated such that no operator input is required. Alternatively, the control system 250 can provide a desired degree of automation of certain aspects of a tire demount procedure while leaving other aspects in the manual control of the machine operator. As such, varying amounts of operator participation in tire demount procedures can be provided to meet different needs and preferences.

As shown in the embodiment of FIG. 7, the control system 250 generally includes a controller 252 operatively coupled to actuators 254 and 256 each associated with the support frame 138 (FIGS. 4-7) and therefore positioning the tool assembly 114 on the machine 100. The actuators 254 may be a horizontal actuator that moves the support frame 138 and attached tool assembly 114 along an axis generally perpendicular to the machine drive axis 112 (FIG. 1) such that a radial position of the tool assembly 114 can be adjusted to meet varying diameters of wheel rims 106 and tires 108. The actuators 256 may be a vertical actuator and move the support frame 138 and tool assembly along an axis generally parallel to the machine drive axis 112 (FIG. 1). As such, the actuator 254 may move the tool assembly 114 radially toward and away from the machine drive axis 112 (FIG. 1) to an appropriate radial locations on the tire 108 relative to the machine drive axis 112, and the actuator 256 may move the tool assembly 114 along the drive axis 112 to apply appropriately directed pressure to mount or demount a tire 108 from a wheel rim 106.

In the illustrated embodiment, the actuators 254 and 256 each include feedback control elements in the form of position sensors 258, 260. As such, the machine 100, via the controller 102, may be capable of positioning the tool assembly 114 to the demount start position in an automated manner.

It should also be understood that the control system 250 in another embodiment may intelligently learn and repeat appropriate start positions for tire demount procedures with some operator assistance. For example, an operator may manually position the tool assembly 114 relative to any given wheel rim 116, and the controller 252 may save the vertical and horizontal positions known to it via the sensors 258, 260 to create profiles for future use and recall for tires and rims of similar types, which can be linked to identifiers provided by an operator or otherwise selected on the machine 100. Thereafter, a machine operator can enter or select the identifier and the controller 250 can automatically operate the actuators 254, 256 to the corresponding start positions.

In another embodiment, the controller 252 may be preprogrammed with predetermined start positions, or otherwise retrieve start positions from a database or other source. In such a scenario, the machine operator need not teach the start positions to the machine 100, but rather must only enter or select the pertinent identifiers for wheel rim 106 and tire 108 combinations so that the machine can locate the appropriate profile for use in a demount process.

As still another option, further feedback elements such as force detection sensors and machine vision elements may be provided in the control system 250 to facilitate automated positioning of the tool assembly 114 without the machine having prior knowledge of a rim type or tire type involved in the demount procedure. In such scenarios, the profile needed to position the tool assembly 114 is self-identifying to the machine 100.

The controller 252 is further coupled to the demount actuator 152, and a feedback element in the form of a position sensor 262 may monitor a position of the actuator 152. The actuator 152 may be operated to extend and retract the demount tool 158 in the tool assembly 114 as described above. The operation of the actuator 152 may be entirely automated in the control system 250.

Optionally, and as also shown in FIG. 7, the controller 252 is coupled to the drive assembly 104, which may further include a spindle actuator 264 that moves the drive axis 112 (FIG. 1) laterally relative to the machine base 102. Thus, for example, in such an embodiment the drive axis 112 (and also the tire 108 and wheel rim 106 coupled to the drive axis 112 with the clamping mechanism) may be moved by the actuator 264 in a direction generally perpendicular to the drive machine axis 112, such as a direction extending toward or away from the tower support frame 130 shown in FIG. 1. A machine equipped with such an actuator 264 may therefore move the drive axis 112 toward the tool assembly 114 (and other machine tools as described above), in addition to or in lieu of the actuators 254 and 256. The spindle actuator 264 may likewise be equipped with a position sensor 266 providing an ability for automated, closed loop control of the actuator 264.

If desired, the clamping mechanism that couples the wheel rim 106 and tire 108 to the drive assembly 104 may be movable by still another actuator in a direction perpendicular to the drive axis 112.

In various embodiments, the controller 252 may be, for example, a microcomputer, a programmable logic controller, or other processor-based device. Accordingly, the controller 252 may include a microprocessor 280 and a memory 282 for storing instructions, control algorithms and other information as required for the machine 100 to function in the manner described. The controller memory 182 may be, for example, a random access memory (RAM), or other forms of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the controller 252 with equal effect to serve similar objectives. For example, a supercapacitor may be provided to give the controller time to store procedure sensitive data such as the current state in a software based state machine in the event of power loss. Other elements such as line filters and capacitors for filtering noisy power may be included. Disk storage such as a CD-ROM, DVD, or hard disk may be provided for storage of various tire profiles that may be recalled to optimize tire mount or demount processes. The tire profiles may include detailed data regarding dimensional aspects of tires to be changed and other information concerning the tires that may be useful and beneficial to the machine operator or the control system.

In various exemplary embodiments of the control system 250, the actuators 152, 254, 256 and 264 may respectively include hydraulic cylinders, pneumatic actuators, electric motors, or still other types of actuators. The actuator types for the actuators 152, 254, 256 and 264 may be of the same or different type (e.g., hydraulic, pneumatic, electric or other) in numerous variations of machines.

Likewise, in various exemplary embodiments, the position sensors utilized in the control system 250 may include positioning encoders, proximity switches or other switch devices, Hall Effect sensors, machine vision elements and other sensors and technologies known in the art. More than one type of positioning sensor or sensing technology may be utilized in numerous variations of machines with similar effects.

The control system may operate and implement the exemplary processes described below to demount tires in a substantially complete, if not entirely, automated manner.

Figure 8:
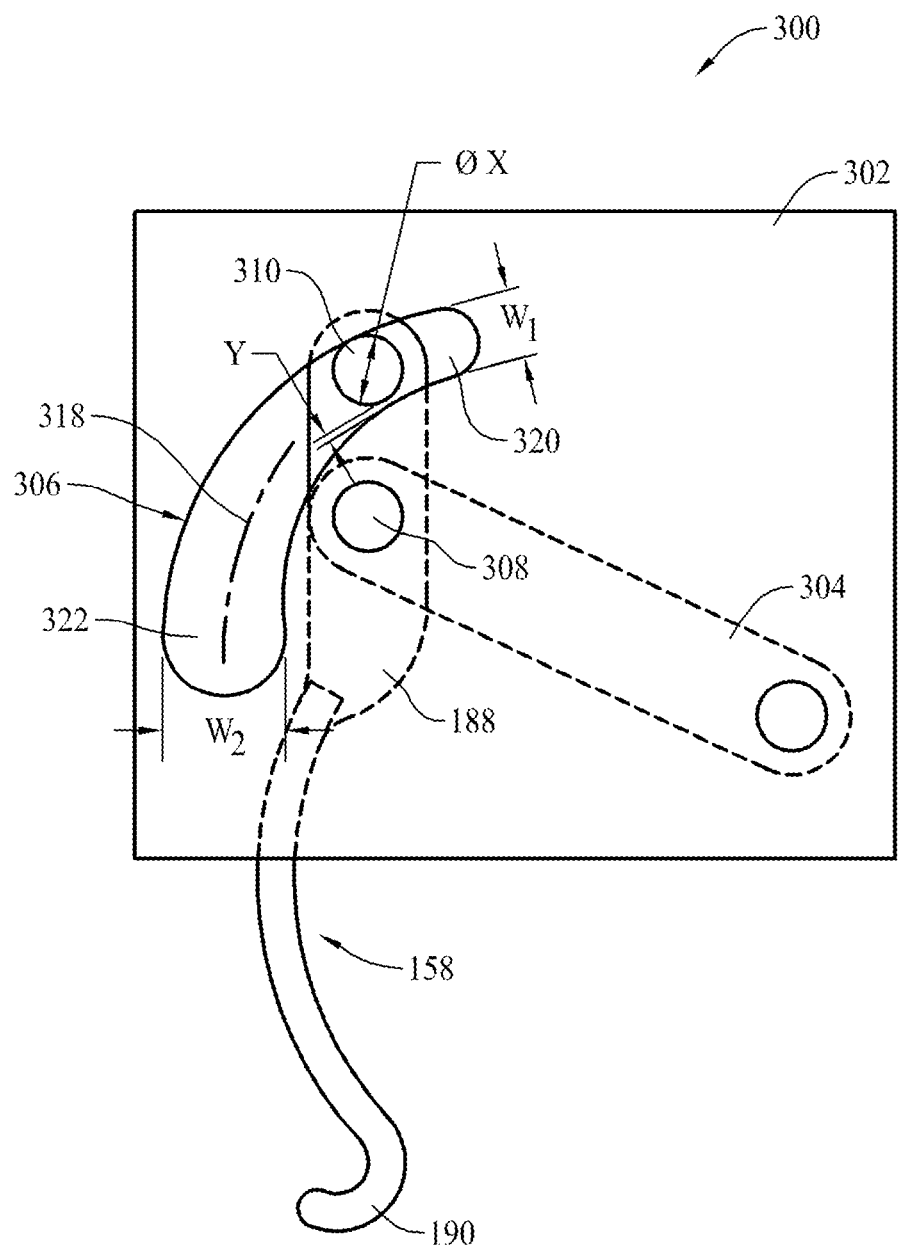
FIG. 8 schematically illustrates another exemplary embodiment of a demount tool assembly for a tire changing machine.
Figure 9:
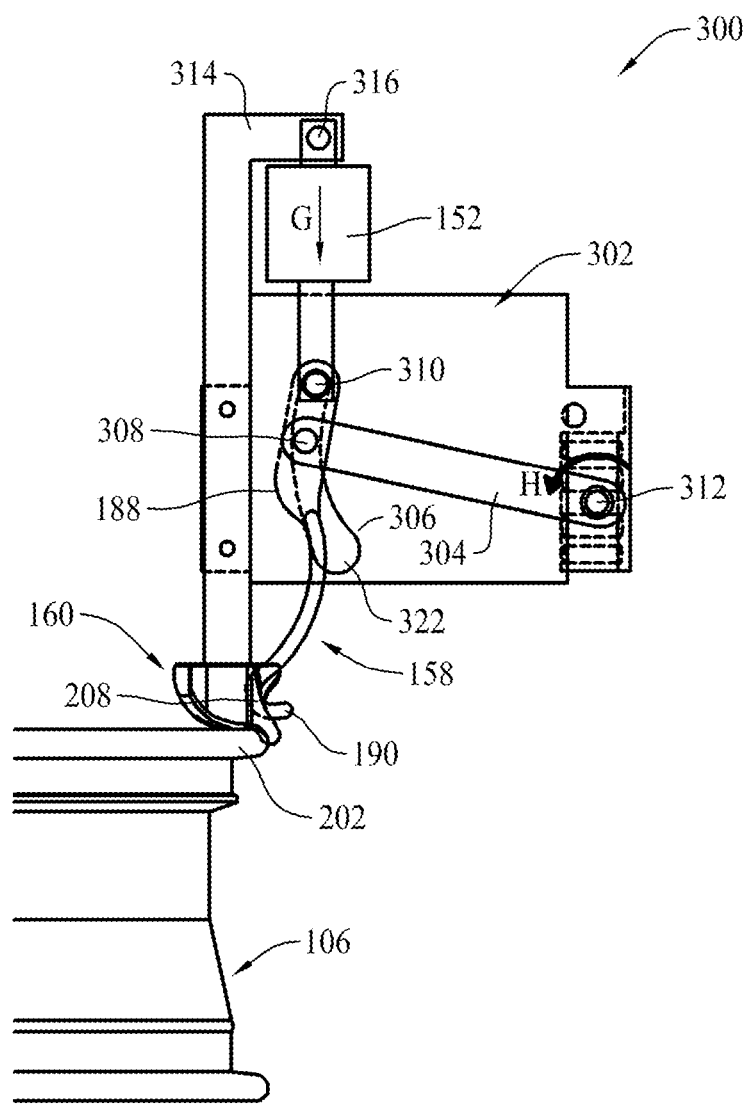
FIG. 9 is a partial view of a machine including the demount tool assembly shown in FIG. 8 in a first operating position.
Figure 10:
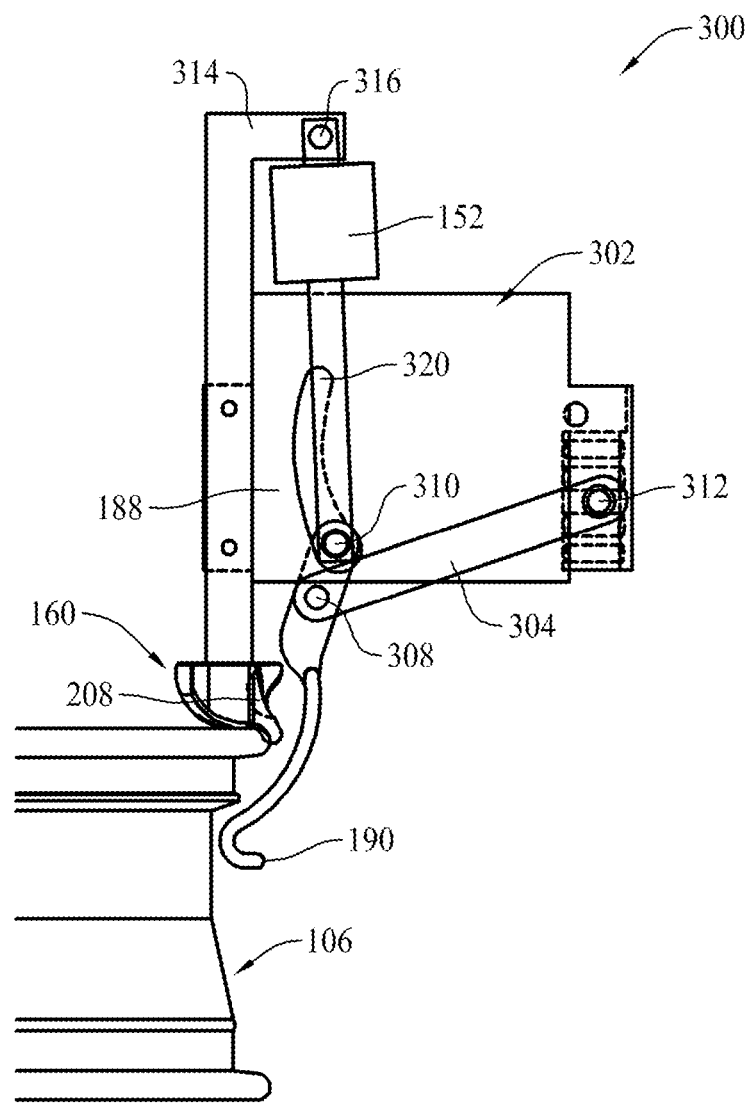
FIG. 10 is a view similar to FIG. 9 but showing the demount tool assembly in a second operating position.

FIG. 8 illustrates another exemplary demount tool assembly 300 in schematic form, and FIGS. 9 and 10 show the demount tool assembly in different operating positions in a tire demount procedure. The demount tool assembly 300 may be used in lieu of the demount tool assembly 114 with the machine 100 (FIG. 1), and may likewise be utilized with the control system 250 (FIG. 7) to demount tools in an automated manner.

Figure 11:
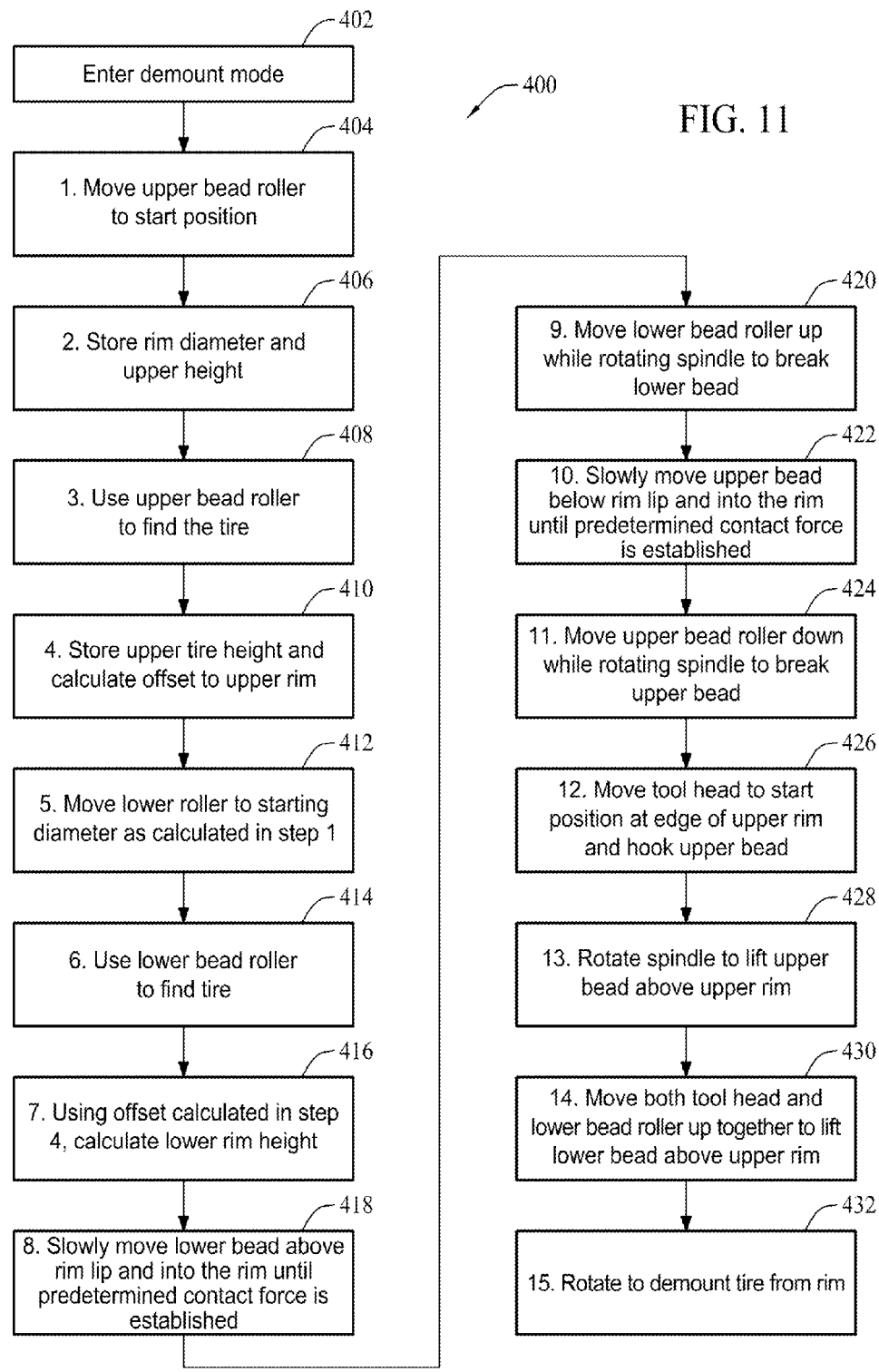
FIG. 11 is a flowchart of an exemplary method of demounting a tire with the machine shown in FIG. 1.

In the example shown in FIGS. 8-10, the demount tool assembly 300 includes a support base plate 302, a pivot arm 304, a guide element 306 and the demount tool 158. The proximal end 188 of the tool includes a first pivot point 308 coupled to the pivot arm 304 at one end thereof, and a second pivot point 310 coupled to the guide element 306. As shown in FIGS. 10 and 11, the actuator 152 may further be coupled to the second pivot point 310 in the tool proximal end 188. The pivot arm 304 includes a fixed pivot point 312 at an end thereof opposite the first pivot point 308 of the tool proximal end 188. The actuator 152 may be mounted to a support 314 at a pivot point 316. The support 314, which may include the wheel mount head 160 is movable relative to the wheel rim 106 and tire 108 by an actuator (or actuators) to move the tool assembly 200 into or out of a position where a tire demount procedure may be executed.

In the exemplary embodiment depicted, the actuator 152, the pivot arm 304 and the demount tool 158 are all coupled to the same side of the support plate 302. In another embodiment, however, this is not strictly necessary and some of the components 152, 304 and 158 could be mounted on different sides of the plate if desired.

The guide element 306 is provided in the form of a curvilinear or arcuate slot having a tapered width measured in a direction perpendicular to an imaginary axial centerline 318 of the slot. Thus, as shown in FIG. 8, the slot 306 has a first width $W_1$ at a first end 320 and a second width $W_2$ as a second end 322 opposite the first end 320. In between the ends 320 and 322 the slot 306 has a variable width that increases from $W_1$ at the first end 320 to $W_2$ at the second end 322. As such, the slot 306 becomes progressively wider along its centerline 318 from the first end 320 to the second end 320.

More specifically, the slot width $W_1$ at the first end 320 at the first end 230 is selected in an exemplary embodiment to be an amount equal to a diameter x of the first pivot point 310, which may be a pin riding in the slot 306, plus an additional amount y selected to provide a degree of clearance between the width $W_1$ and the pin diameter so that the pin may slide freely in the slot 306. Preferably, the value y should be minimized if possible, but its actual value will vary with different embodiments of the assembly 300.

The slot width $W_2$ at the second end 322 is selected to be equal to the pin diameter x plus a scaled value y. That is, the value y used to determine the slot width $W_1$ at the first end 320 is multiplied by constant n where n is greater than 1.0. The greater the value of n, the greater degree of movement possible as the demount tool pivot point 310 is moved along the slot 306. The slot 306 accordingly provides a limited degree of freedom for the tool pivot point 310 to move relative to the slot centerline 318 as it traverses the length of the slot 306. In other words, the pivot point 310 is not limited to a fixed and predetermined path in the slot, but rather has some ability to deviate from exactly following the axial centerline 318 of the slot 306, or either of the lateral edges of the slot 306 for that matter.

Like the tool assembly 114, the actual path of the pivot point 310 when demounting any tire 108 will be dictated by physical attributes of the wheel rim 106 and tire 108 involved, and not by user selection or presence. As such, the pivot point 310 will deviate (or not) from the axial centerline 318 of the slot 306 without prior knowledge, and perhaps without perception, by a human operator.

The pivot arm 304 in the exemplary embodiment shown has a fixed length, and accordingly swings the tool pivot point 308 along a generally constant arc. Coupled with the pivot point 310, however, that traverses the guide slot 306 with some freedom to deviate from the path of the slot 306, the tool 158 may exhibit a range of different motion paths at its distal end that conventional demount tools are unable to provide. The assembly 300 may therefore reliably hook tire beads on wheel rim and tire combinations that are problematic in the known and conventional lever-less machine types discussed above. Notably, the tool action in the assembly 300 may be automated so that the tool distal end 190 can reliably grip tire beads across a wide variety of wheel rim and tire combinations without intervention by a human operator.

FIGS. 9 and 10 illustrate operation of the tool assembly 300. In FIG. 9, the assembly 300 is moved into position with the wheel mount head 160 in physical contact, or very near to but not in contact, with the wheel rim lip 202 to establish a start position for a tire demount operation. As before, the depending finger 204 of the wheel mount head 160 (shown in FIG. 2) may act as a wedge in the starting position to begin to press down on the tire proximate the wheel rim 106 and begin separating the tire side wall from the wheel rim lip 202 to allow tool access to the tire bead.

Once the wheel mount head 160 is in place in the start position, it remains in place and does not move for the remainder of the demount procedure. The demount tool 158 may be extended from the pocket 208 by operating the actuator 152, causing the pivot point 308 to be moved downward in the direction of arrow G and forcing the first pivot point 308 of the demount tool 158 to move along the guide slot 306. As the pivot point 310 begins to move, the second pivot point 310 of the demount tool also begins to move and the pivot arm 304 begins to swing about the fixed pivot point 312 in the direction of Arrow H. The combined motion of the tool pivot points 308 and 310 guides the tool distal end 190 out of the pocket 208 and the distal end 190 becomes free to contact the tire side wall and provide pressure to push the tire bead toward a drop center of the wheel rim 106 as shown in FIG. 10.

As the tool distal end 190 moves, the guide slot 306 affords some ability for the tool to self-adjust to a position where it can grab the tire bead, while the pivot arm 304 offers some rigidity and strength to force the distal end 190 of the tool 158 into place, if necessary, to grab the tire bead. Thus, instances of the tire bead becoming stuck under to the tool are mitigated, if not avoided, by the tool assembly 302, The variable arcuate path of motion afforded by the guide slot 306 and the fixed curved motion of the pivot arm 304 allow for complicated curved paths of motion that are not possible with conventional lever-less machines. Further, the curved paths of motion may vary as needs dictate, and thus accommodate a range of wheel rims and tires that conventional lever-less machines may not.

To provide additional variability in the motion paths of the demount tool 158, or perhaps even to provide different ones, it is contemplated that the rigid arm 304 in the assembly 300 could be replaced with a compliant link such as the link 156 described above. Combinations of certain aspects or features of the assemblies 114 and 300 are contemplated and are possible to provide further enhancements to the basic functionality described.

FIG. 11 is a method flowchart of an exemplary algorithm 400 executable by the machine 100 including the controller 252 as described above. The algorithm may be executed in whole or in part by the controller 252 to provide a completely automated tire demount procedure without human assistance or input or a partly automated tire demount procedure. The algorithm 400 assumes that a wheel rim and tire have been loaded on and secured to the machine 100 for a tire change operation.

The algorithm 400 includes, as shown in FIG. 11, entering a tire demount mode at step 402 from a main control loop. In an exemplary embodiment, a machine operator may optionally select, for example, a tire mount mode or a tire de-mount mode of operation using one of the input selectors provided on the machine. On machines not including distinct tire mount and de-mount modes, the step of entering the demount mode as shown at step 402 may of course be omitted.

As shown at step 404, the upper bead roller 116a (FIG. 1) may be moved to a start position wherein the upper bead roller 116a is placed in contact with the wheel rim lip 202 (FIG. 3). In various embodiments, this may be accomplished manually by the machine operator, or automatically by the machine. Various ways of accomplishing the start position in an automated manner are known and may be utilized.

As shown at step 406, once the start position is obtained, the rim diameter and its upper height can be calculated and stored in the controller memory 282 (FIG. 7).

At step 408, the upper bead breaker roller 116a is raised from the start position and retracted from the wheel rim for a predetermined distance. The bead breaker roller 116a is then lowered until it contacts the upper tire sidewall. This is sometimes referred to as "finding the tire" and as shown in step 410 establishes an upper tire height and offset relative to the wheel rim lip 202. The upper tire height and offset is then stored in the controller memory 282.

At step 412, the lower bead breaker roller 116b (FIG. 1) is moved to a radial location corresponding to the stored rim diameter from step 406. The lower bead breaker roller 116b may then be moved upwardly at step 414 until it contacts the lower tire sidewall. Thus, similar to the upper bead breaker 116a as described above, the lower bead breaker 116b is used to "find the tire" and establish a lower tire height. The lower tire height may be calculated and stored in the controller memory 282 as shown at step 416.

From steps 404 through 416, the controller 252 has obtained the key parameters of the wheel rim and tire for demounting purposes. The controller 252 may then utilize these parameters (e.g., the wheel rim diameter and the upper and lower tire height relative to the wheel rim) to demount the tire without assistance from a human operator.

At step 418, the lower bead breaker 116b is moved into the wheel rim lip 202 until a predetermined amount of contact force has been established. This may be accomplished in the manner described in the commonly owned U.S. Provisional Application Ser. No. 61/327,361 filed Apr. 23, 2010 and entitled "Tire Bead Breaker Device and Methods For Automated Tire Changer Machine" (the disclosure of which is hereby incorporated by reference) in one example, although other arrangements are possible and may likewise be utilized. At step 420, the lower bead breaker 116b is then moved upwardly against the tire sidewall to break the lower tire bead seal, while the drive assembly 104 is operated to rotate the wheel rim 106 and tire 108 until the lower tire bead is completely broken. The contact force established at step 420 may be at least partially stored in a compliant member, also described in U.S. Provisional Application Ser. No. 61/327,361 and released to further assist and enhance tire bead breaking operations as needed, depending on the particulars of the wheel rim and tire combination for a given demount procedure.

In contrast to conventional methodology for tire bead breaking with tire changer machines, in which much concern and attention is paid to avoiding any contact between the bead breaker tools and the wheel rim, the contact force is beneficially provided to effectively break tire beads from even the most difficult wheel rim and tire combinations without damaging the wheel rim. Such application of contact force makes it possible to break tire bead seals quite quickly compared to other known techniques utilized by existing machines that avoid any contact between the machine tools and wheel rims. By establishing the contact surface force in a sufficient amount to ensure that the bead breaker tool 116b remains in contact with the wheel rim 106 until the lower tire bead is completely broken loose, variations in the wheel rim profile for any given wheel rim 106 can become inconsequential to the effectiveness of tire bead breaking.

By virtue of such contact force, the bead breaker tool 116 can accordingly be allowed to follow the profile of the wheel rim profile, which may be non-linear and which also may vary from rim to rim as shown in FIGS. 3-6 and FIGS. 9 and 10, without the particular profile of the wheel rim 106 being made known to the machine in advance. This simplifies the control scheme considerably in relation to known machines using machine vision technologies and the like to identify particular wheel rim profiles and geometry information as tires are being demounted. Appreciable cost savings may also be realized by using contact force as described above, as compared to machine vision systems and the like.

At steps 422 and 424, the upper bead breaker 116a is moved into the wheel rim lip 202 until a predetermined contact force has been established, and then moved downwardly against the tire sidewall to break the upper tire bead seal, while the drive assembly 104 is operated to rotate the wheel rim 106 and tire 108 until the lower tire bead is completely broken. The contact force may be established with the upper bead breaker 116 in accordance with U.S. Provisional Application Ser. No. 61/327,361 as discussed above, or in another manner.

Upon completion of steps 418 through 424, the upper and lower tire bead seals are broken as shown in FIG. 3 and the tire is ready for demounting. While the exemplary bead breaking processes described is believed to be beneficial for its ease of automation, it is recognized that bead breaking may alternatively be accomplished in a variety of ways to prepare the tire for demounting, including but not limited to non-contact methods wherein the bead breaker tools are spaced from the wheel rim.

At step 426, the demount tool assembly (e.g., the tool assembly 114 shown in FIGS. 2-6 or the assembly 300 shown in FIGS. 8-10) is moved to the start position as described above. The demount tool may then be extended from the tool assembly and hook the tire bead as described above. Once the tire bead is hooked, the demount tool may be retracted to lift the upper tire bead above the wheel rim lip 202, and the drive assembly 104 may then be operated as shown at step 428 until the upper tire bead is entirely positioned above the wheel rim lip 202.

At step 430, the tool assembly and the lower bead breaker 116b are both moved upward to lift the lower tire bead above the wheel rim lip 202. The drive assembly 104 is again operated to rotate the wheel rim until the tire is completely demounted from the rim. At this point, the tire may be removed from the machine and another tire may be mounted in its place. The wheel mount head 160 of the demount tool assembly may be used to mount the replacement tire.

It is believed that those in the art may program the controller 252 or otherwise configure it to implement the algorithm 400 without further explanation. It is recognized that not all of the steps as shown and described are necessary to accomplish at least some of the benefits described. It is further recognized that the sequence of the steps as described are not necessarily limited to the particular order set forth, and that some of the functionality described can be achieved with other sequences of steps. Additional steps beyond those specifically described may be implemented in combination with the steps described. The exemplary algorithm 300 is therefore offered for purposes of illustration rather than limitation.

Figure 12:
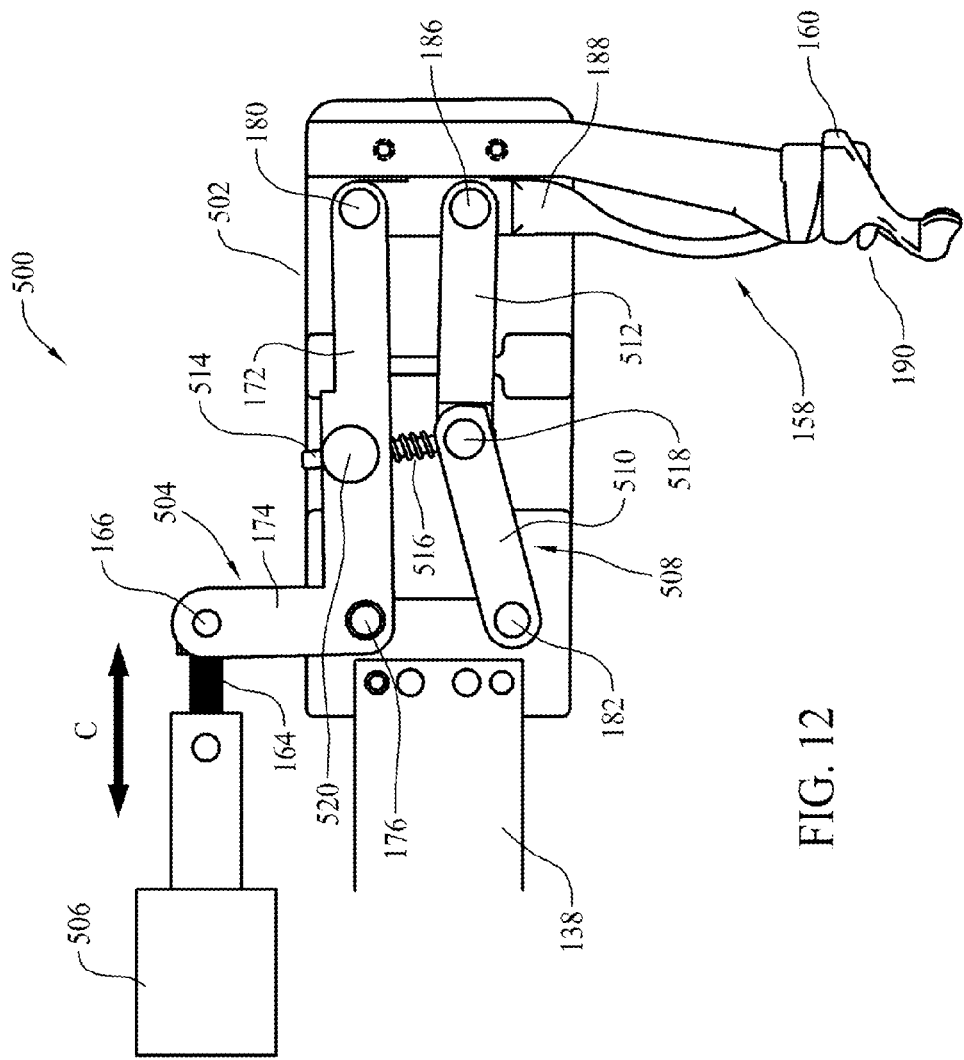
FIG. 12 illustrates another exemplary embodiment of a demount tool assembly in a first operating position.

FIG. 12 illustrates another exemplary embodiment of a demount tool assembly 500 that may provide similar benefits to the tool assembly 114 (FIGS. 2-6) and the tool assembly 300 (FIGS. 8-10) described above. The tool assembly 500 may be used in lieu of the tool assembly 114 or 300 on the exemplary tire changing machine 100 (FIG. 1), may be coordinated with the exemplary control system 250 (FIG. 7), and may be operated according to the exemplary algorithm 400 (FIG. 11) to demount tires in an automated manner. The assembly 500, like the assembly 114, is operable in a compliant mode and in a rigid mode to facilitate demounting tires of all types on a variety of wheel rims.

The tool assembly 500 includes a support base plate 502 mounted to the frame support 138 (FIG. 1), a pivot arm 504, an actuator 506, a guide element 508, the demount tool 158, and the wheel mount head 160 mounted stationary to the support plate 502 and configured to locate the tool assembly 500 in proper position relative the wheel rim 106 and tire 108 in a demount procedure as described above. The demount tool 158 is extendable and retractable relative to the wheel mount head 160, and also positionable relative to the support plate 505 as also described above. The distal end 118 of the demount tool 158 is positionable by the pivot arm 504 and the guide element 508 to cause the distal end 190 of the tool 158 to unseat from the wheel mount head 160 for demounting a tire.

The actuator 506 in the exemplary embodiment shown is a linear actuator movable along an axis in the direction of arrow C. A distal end of the actuator is provided with a coupler 164 establishing a first pivot point 166 with the pivot arm 504. The pivot arm 504, like the pivot arm 154 in the assembly 114 described above, includes an elongated longitudinal portion 172 having a first axial length and a lateral portion 174 of a second, and shorter, axial length than the longitudinal portion 172. The longitudinal and lateral portions 172 and 174 further extend generally perpendicular to one another, and as shown in the exemplary embodiment of FIG. 12 the arrangement of the portions 172 and 174 imparts a generally L-shaped profile to the pivot arm 504. The pivot arm 154 is attached to the support plate 150 at a pivot point 176 such that the arm 504 can rotate thereabout. While in the illustrated embodiment the pivot point 176 is approximately at the intersection of the longitudinal and lateral portions 172, 174, other arrangements are possible in alternative embodiments.

A pivot 166 interconnects the actuator coupler 164 and the distal end of the pivot arm lateral portion 174. The distal end of the pivot arm longitudinal portion 172 establishes a pivot point 180 with the proximal end 188 of the demount tool 158. When the actuator 506 is moved toward the pivot arm 504 in FIG. 12 (i.e., to the right in FIG. 12), the pivot 504 arm rotates or swings about the pivot point 176 as shown in FIGS. 13 and 14, causing displacement of the proximal end 188 of the demount tool 158, and in turn, causing the distal end 190 of the demount tool 158 to extend from the wheel mount head 160.

The guide element 508 in the example shown in FIG. 12 includes a first link 510, as second link 512, a shaft 514, and a bias element 516. The first link 510 is mounted to the plate 150 via a pivot point 182 at one end thereof. At an opposing end of the link 510 a pivot point 518 is established. The second link 512 is attached to the first link 510 via the pivot point 518 at one end, and at an opposing end is coupled to the proximal end 188 of the demount tool 158 via a pivot point 186. The shaft 514 extends between the pivot point 518 interconnecting the first link 510 and the second link 512 to a pivot point 520 in the longitudinal portion 172 of the pivot arm 504. The pivot 520 is spaced from each of the pivot points 176 and 180 of the longitudinal portion 172 of the pivot arm. As such, and by virtue of the shaft 514, the pivot point 520 and the pivot point 518 interconnecting the guide element links 510 and 512 are inter-dependent as the pivot arm 504 is moved by the actuator 506. The bias element 516, shown in FIG. 12 as a coil spring, extends around the shaft 514 and provides a limited ability of the demount tool distal end 190 to vary from an otherwise fixed path of motion of the demount tool as explained below.

FIG. 12 shows the assembly 500 in a first operating position wherein the distal end 190 of the demount tool 158 is maintained in a retracted position seated position in the wheel mount head 160.

Figure 13:
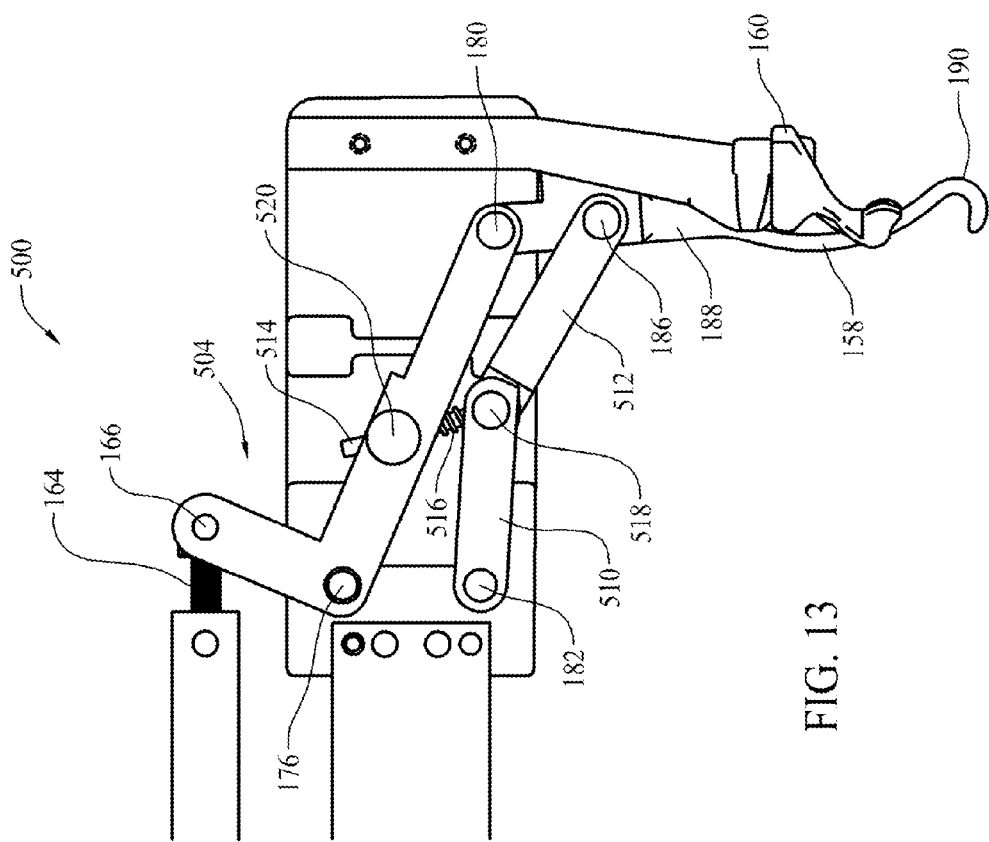
FIG. 13 illustrates the demount tool assembly shown in FIG. 12 in a second operating position.
Figure 14:
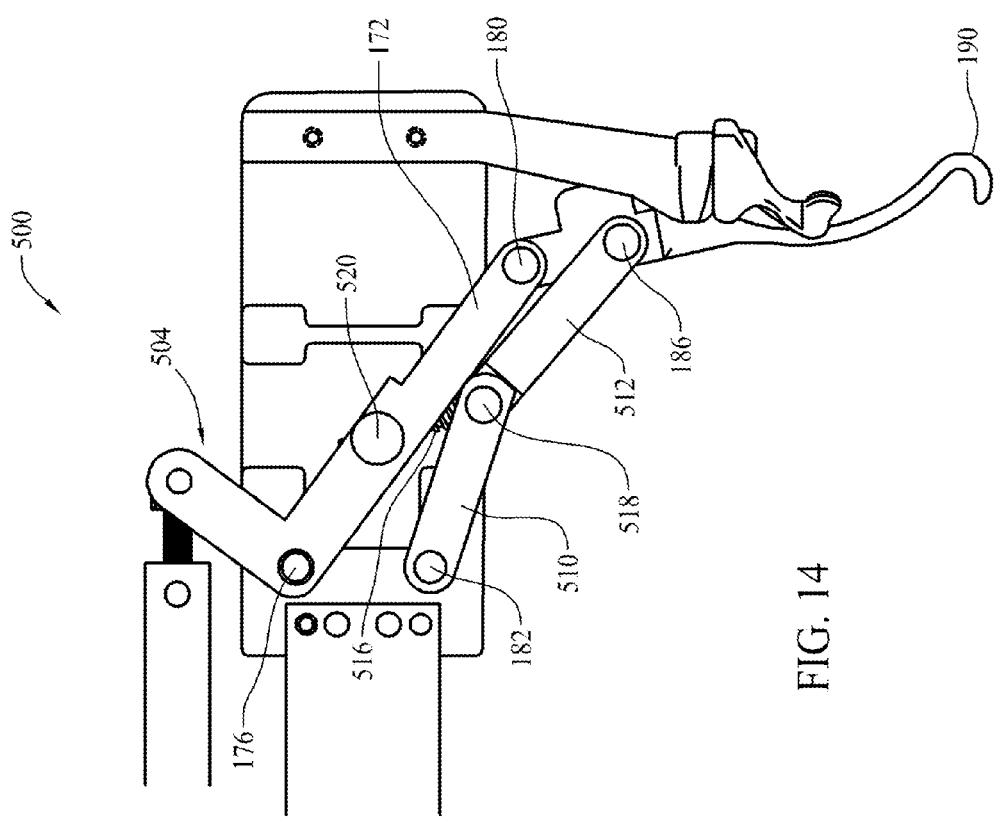
FIG. 14 illustrates the demount tool assembly shown in FIG. 12 in a third operating position.
Figure 15:
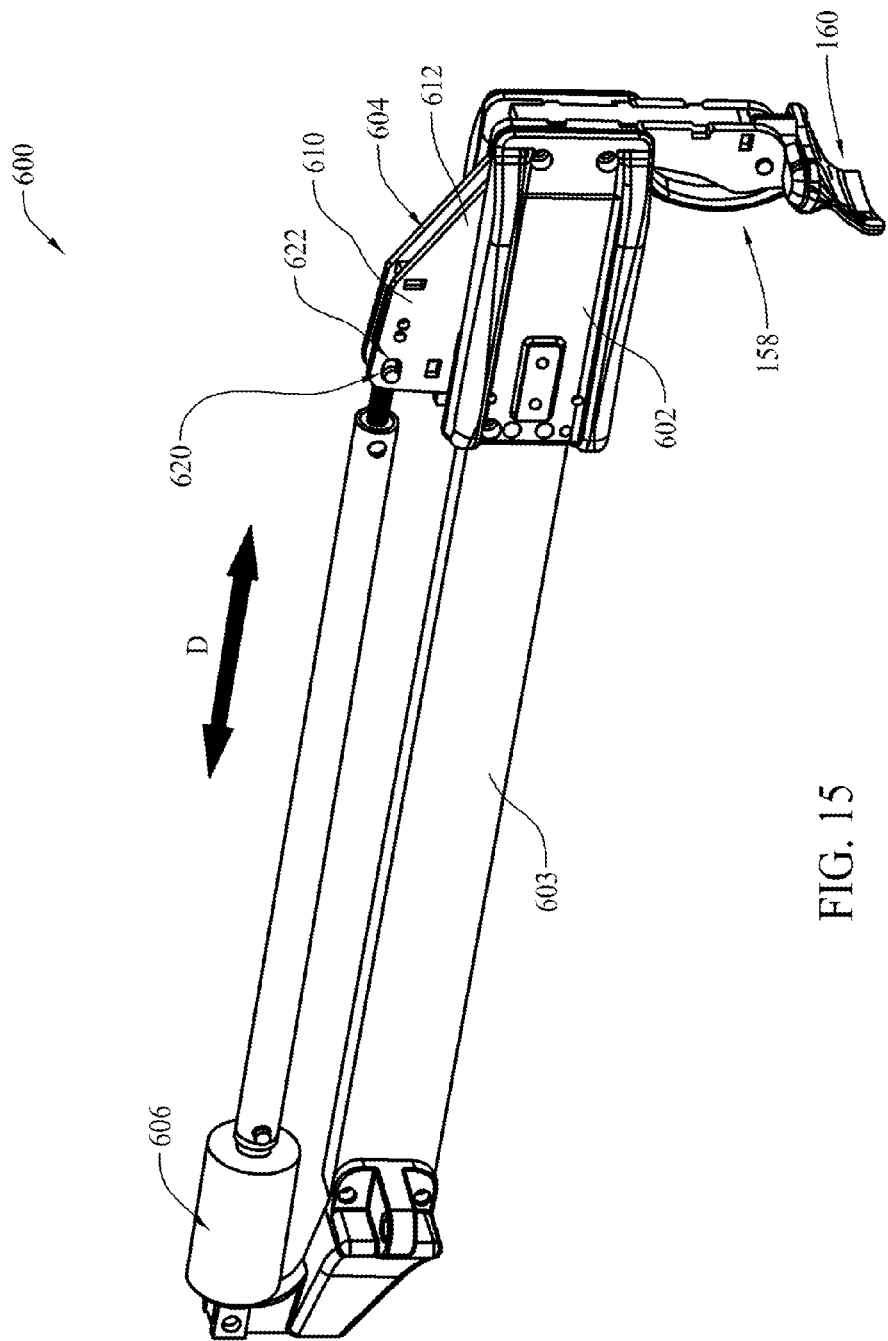
FIG. 15 illustrates another exemplary embodiment of a demount tool assembly for the machine shown in FIG. 1.

FIG. 13 illustrates the demount tool assembly 500 shown in a second operating position wherein the pivot arm 504 is rotated about the pivot point 176, causing the pivot point 180 of the pivot arm 504 and the proximal end 188 of the demount tool 158 to swing downwardly as shown. As a result, the distal end 190 of the demount tool 158 unseats and extends from the wheel mount head 160. The distal end 190 of the tool accordingly begins its downward descent into the drop center of the wheel rim as this occurs. As can also be seen in FIG. 13, while this happens the guide element links 510 and 512 rotate about the pivot points 182, 518 and 186. That is, the guide element link 510 may rotate about the pivot point 182 on one end thereof while the other end coupled to the pivot 518 also rotates. The guide element link 512 may further rotate relative to the guide element link 510 at the pivot point 518, as well as rotating at the pivot point 186 that is connected to the demount tool proximal end 188. The movement of the linkage from the position shown in FIG. 12 to the position shown in FIG. 13 generally represents the compliant mode of operation wherein the assembly provides a flexibility to deviate from an otherwise predetermined path of motion of the demount tool 158.

The characteristics of the bias element 516 may dictate the relative freedom of rotation of the guide element links 512 and 510 in the compliant mode, as well as the spatial relationship between the pivot points 520 and 518. As such the bias element 516 may be strategically selected to achieve a desired path of motion of the demount tool 158, while also allowing the bias element 516 to flexibly adapt the rotation of the guide element links 510 and 512 as needed. In the example of a coil spring, the bias element 516 can be compressed and relaxed to vary the spacing between the pivot point 520 of the pivot arm 504 and the pivot point 518 of the coupled guide element links 520. In other embodiments, a tension spring or torsion spring, or still other resilient bias elements and the like capable of storing and releasing force and mechanical energy may alternatively be utilized with similar effect.

Because of the interconnected pivot points 520 and 518 of the pivot arm 504 and the respective guide element links 510 and 512, the distal end 190 of the demount tool 158 may follow a generally predetermined path of motion determined by the mechanical linkages, with the bias element 516 providing a limited degree of freedom to deviate from the generally predetermined path of motion. Specifically, the bias element 516 allows the relative spacing of the pivot points 520 and 518 to vary, if needed, to effectively position the distal end 190 of the demount tool 158 in the drop center of the wheel rim and to catch the tire bead in a similar manner to that shown in FIG. 4. Also, because the pivot point 518 allows the guide element links 510, 512 to rotate relative to one another, a rather complex, curved path of motion of the demount tool 158, as well as good deal of variation in motion paths is possible to demount a wide variety of tires on varying wheel rims.

As shown in FIG. 13, the coupled ends of the guide element links 510, 512 at the pivot point 518 may be designed to physically interfere with one another once the guide element link 512 pivots relative to the pivot point 518 by a predetermined amount. In the example shown in FIG. 13, the guide element link 512 has rotated in a generally clockwise direction about the pivot point 518 and hence has rotated relative to the guide element link 510, but is prevented from further rotation in the clockwise direction because of the physical interference created between the coupled ends of the guide element links 510 and 512 in this position. Such interference can be accomplished in a variety of ways depending on the geometry of the link ends, and while one such arrangement is show others are of course possible. Once this point of interference is established, rotation of the guide element 512 relative to the guide element link 510 will cease, and the two guide elements 510 and 512 will rotate as one unit about the pivot point 182 as the pivot arm 154 continues to be driven by the actuator 506. Thus, the compliance in the assembly generally ceases and the assembly enters a rigid mode of operation.

The position shown in FIG. 13 is perhaps especially beneficial when the demount tool distal end 190 is passing near the bottom of the wheel mount head 260. At this point the distal end 190 needs to begin a curved path towards the wheel rim drop center. The demount tool distal end 190 is further prevented from becoming stuck on the tire side wall in the position shown in FIG. 13, and the curved path avoids the tire from damage that may otherwise result if the demount tool 158 were to be forced straight down.

While in the exemplary embodiment shown, the assembly 500 enters a rigid mode of operation with no compliance to permit a deviation in the path of the demount tool 158, in another embodiment, the bias element 516 may, depending on the characteristics of the bias element 516, continue to allow a possible variation in the distance between the pivot point 520 and pivot point 518 such that some compliance in the assembly is present to allow limited deviations from an otherwise predetermined path of the demount tool 158. Any compliance available in would therefore be less than before the guide element links 510, 512 were brought into mechanical interference, but some compliance would remain.

As shown in FIG. 14 the demount tool assembly 500 is further driven by the actuator 506 past the position shown in FIG. 13 and causing the pivot arm 154 to further swing about the pivot point 176. At the position shown in FIG. 14, the bias element 516 (a coil spring in the embodiment depicted) reaches its maximum state of compression and the distance between the pivot point 520 of the pivot arm 504 and the pivot point 518 of the guide element links 510, 512 becomes fixed. This may coincide, as shown in FIG. 14, with a position wherein the longitudinal portion 172 of the pivot arm 504 comes into physical contact with the coupled ends of the guide element links 510, 512 at the pivot point 518.

Further rotation of the pivot arm 504 from the position shown in FIG. 14 will cause the guide element link 512 to pivot about the pivot point 518 in the opposite direction (e.g., counterclockwise in FIG. 14) to allow still further extension of the demount tool 158 so that the tire bead can be engaged. The ability of the guide element link 512 to further pivot again introduces compliance and flexibility of the demount tool distal end 190 to move to its ultimate position engaging the tire bead. In the position shown in FIG. 14, the distal end 190 of the demount tool 158 is in the drop center of the wheel rim, and the compliance prevents it from becoming stuck in a position wherein it fails to engage the tire bead, and thus allows the distal end 190 to receive and extract the tire bead more effectively.

As demonstrated by FIGS. 12-14 and the foregoing description demonstrate, the assembly 500 offers generally full compliance during a portion of the path of travel of the demount tool 158 in demounting a tire, a limited compliance (possibly no compliance) for a subsequent portion of the path of travel, and other compliance when the demount tool 158 is in the wheel rim drop center. As such, compliance is restricted or promoted in various ways throughout the demounting procedure as the demount tool 158 is used.

By reversing the actuator 506 (FIG. 12) and pulling the pivot arm 504 in the opposite direction at the pivot 166 (i.e., to the left in FIGS. 12-14) the demount tool 158 may be returned to its retracted or seated position shown in FIG. 12. The compliance of the assembly is restored as it moves back to and through the position shown in FIG. 13. This assists in locating the demount tool 158 back into its retracted position.

As with the other tool assemblies described above, whether or not the tool assembly 500 ever reaches the rigid mode of operation shown in FIG. 14 would depend on tire properties such as the stiffness of the tire sidewall, attributes of the bias element 516, specific specifications for the actuator 506, the geometry of the guide element links 510, 512 and other possible factors. It is contemplated that in many tire demount operations of the machine 100, the rigid mode of operation shown in FIG. 14 will not be necessary and will not occur. Additionally, the tool assembly 500 may switch between the compliant mode and the rigid mode, or vice versa, without user input or even perception of the user.

Aside from mechanical differences in the tool assemblies to provide compliance up to predetermined degrees and rigid modes of operation thereafter, the benefits of the tool assembly 500 are similar to the benefits of the tool assemblies 114 and 300.

FIGS. 15-18 illustrate various views of another exemplary embodiment of a demount tool assembly 600 that may provide similar benefits to the tool assembly 114 (FIGS. 2-6), the tool assembly 300 (FIGS. 8-10), and the tool assembly 500 (FIGS. 12-14) as described above. The tool assembly 600 may be used in lieu of the tool assembly 114, 300, or 500 on the exemplary tire changing machine 100 (FIG. 1). The tool assembly 600 may likewise be coordinated with the exemplary control system 250 (FIG. 7), and may be operated according to the exemplary algorithm 400 (FIG. 11) to demount tires in an automated manner. The assembly 600, like the other tool assemblies 114, 300 and 500, is operable in a compliant mode and in a rigid mode to facilitate demounting tires of all types on a variety of wheel rims.

The tool assembly 600 includes a support base plate 602 and a mounting arm 603 attachable to the frame support 138 (FIG. 1). The tool assembly 600 also includes a pivot arm 604, an actuator 606, the guide element 508 as described above, the demount tool 158, and the wheel mount head 160 mounted stationary to the support plate 602 and configured to locate the tool assembly 600 in proper position relative the wheel rim 106 and tire 108 in a demount procedure as described above. The demount tool 158 is extendable and retractable relative to the wheel mount head 160, and also positionable relative to the support plate 602 as also described above. The distal end 118 of the demount tool 158 is positionable by the pivot arm 604 and the guide element 508 to cause the distal end 190 of the tool 158 to unseat from the wheel mount head 160 for demounting a tire as described above.

The pivot arm 604, unlike the embodiment 504 described above having elongated and generally distinct longitudinal and lateral portions 172 and 174, has a generally plate-like configuration including a rectangular portion 610 and a substantially triangular or tapered, wedge shaped portion 612 extending from the rectangular portion. The rectangular portion 610 is rotatably mounted to the support plate 602 at a pivot point 614 proximate a lower corner thereof. The wedge shaped portion 612 is attached to the proximal end 188 of the demount tool 158 at a pivot point 616 proximate the leading end of the wedge shaped portion 612. Thus, as the pivot arm 604 rotates about the pivot 614, the proximal end 188 of the demount tool 158 is likewise pivoted about the pivot 616 and causes the distal end 190 of the demount tool 158 to extend or retract from the wheel mount head 160. The guide element 508, in turn, provides compliance and a limited degree of freedom for movement of the demount tool distal end 190 to deviate from an otherwise fixed path of motion when demounting a tire.

The actuator 606 in the exemplary embodiment shown is a linear actuator movable along an axis in the direction of arrow D. A distal end of the actuator is provided with a rod eye 618 that receives a pin 620 extending through the pivot arm 604 to establish a pivot point therewith. In the exemplary embodiment shown, the pivot arm 604 is formed with an elongated slot 622 proximate an upper corner of the rectangular portion 610. A distal end of the rod eye 618 is placed in communication with the slot 622, and the pin extends through the slot and the eye of the rod eye to establish a pivot point about a longitudinal axis of the pin 620. Because the slot 622 is elongated, however, the pin 620 coupled to the rod eye 618 is slidable in the slot 622 and the position of the pivot point relative to the support plate 602 may accordingly vary depending on the position of the pin 620.

Figure 16:
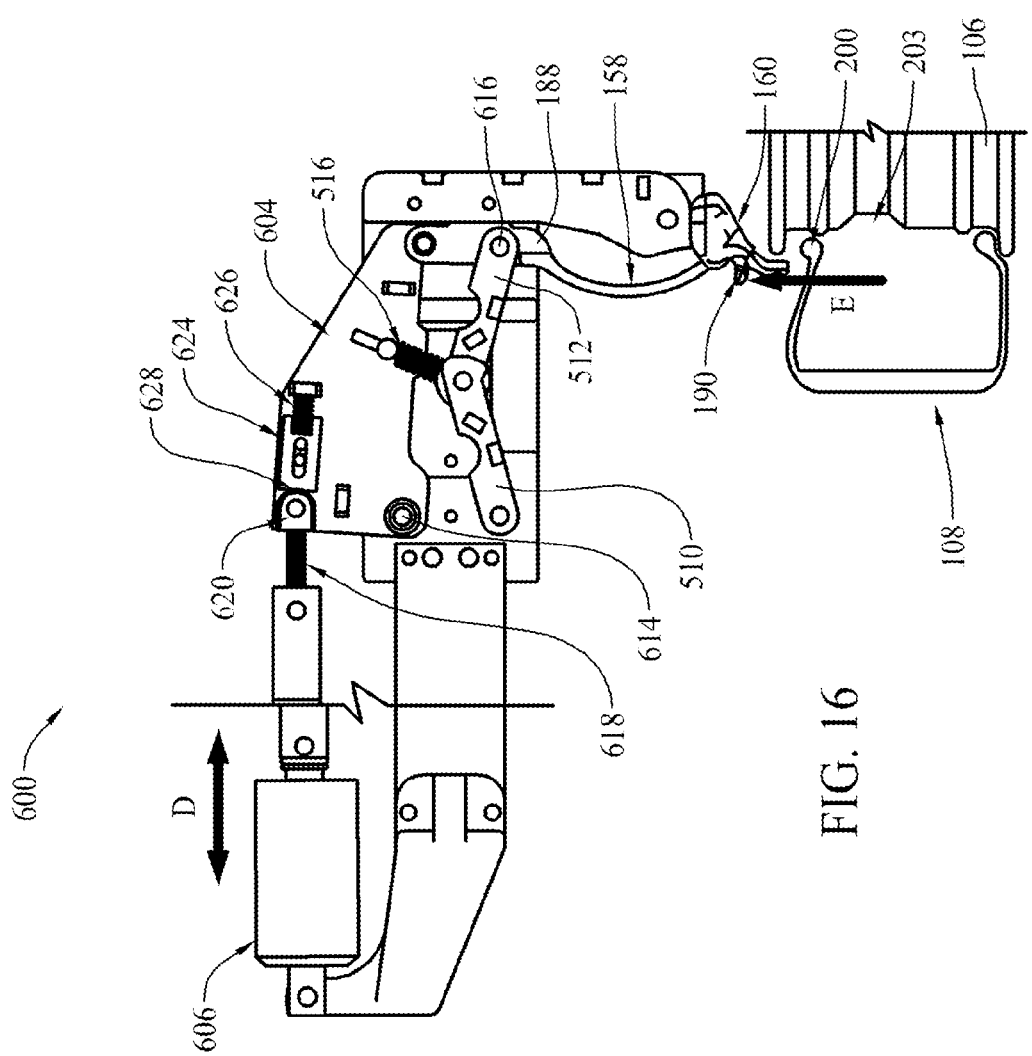
FIG. 16 illustrates the demount tool assembly shown in FIG. 15 in a first operating position.
Figure 17:
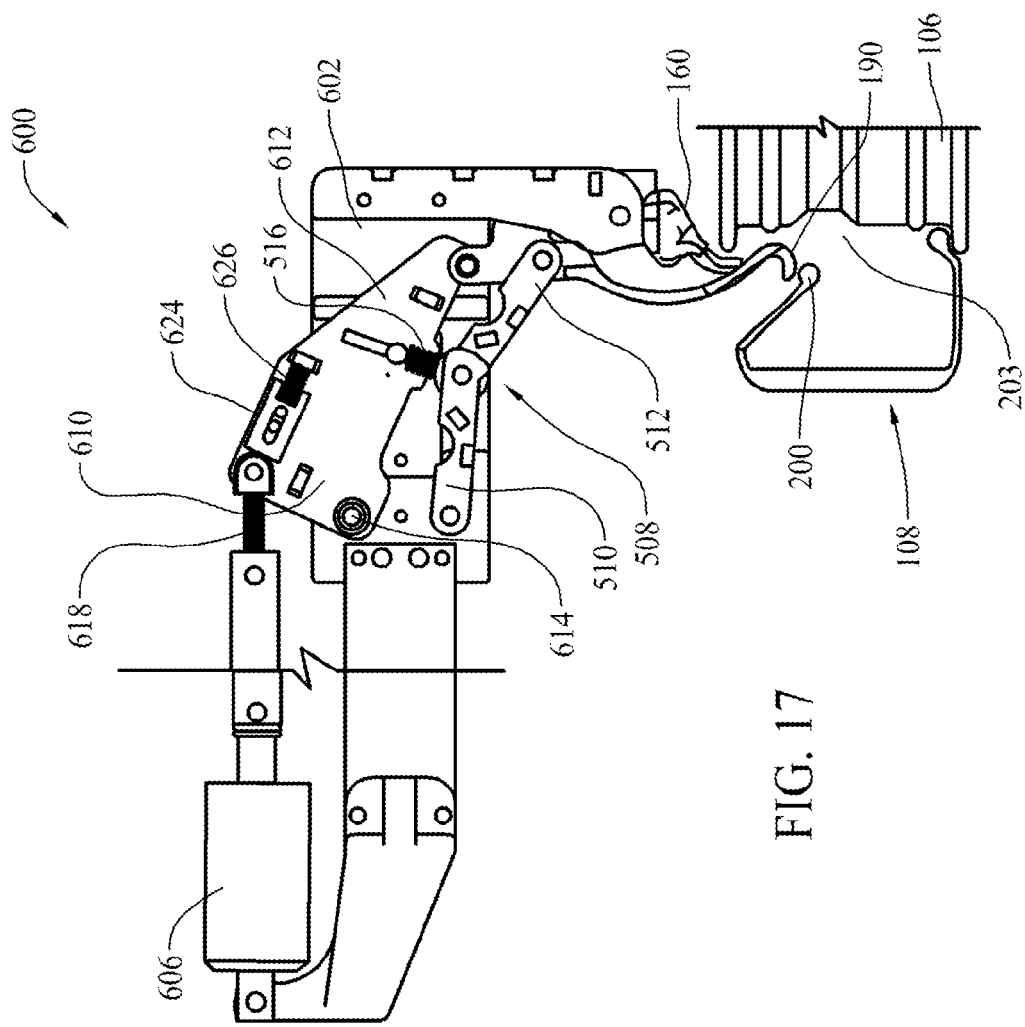
FIG. 17 illustrates the demount tool assembly shown in FIG. 15 in a second operating position.
Figure 18:
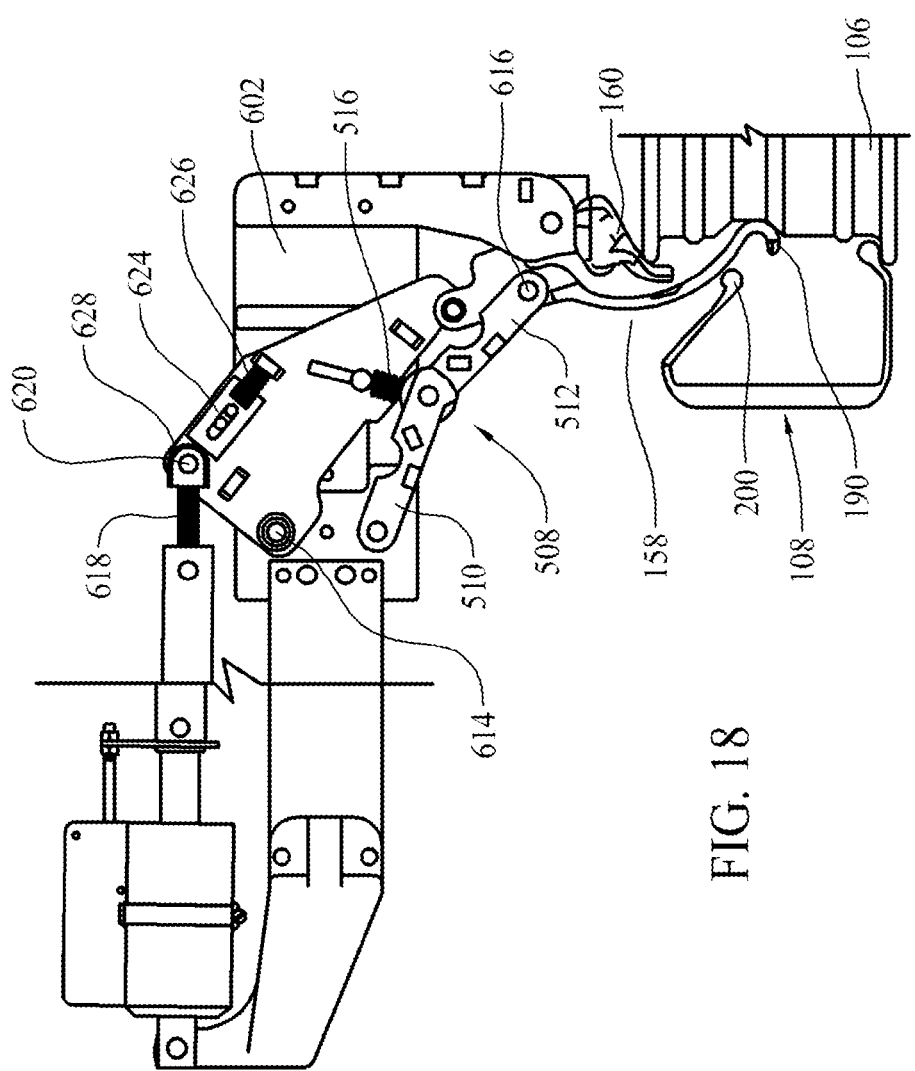
FIG. 18 illustrates the demount tool assembly shown in FIG. 15 in a third operating position.

The rod eye 618 as shown in FIGS. 16-18 includes a rounded engagement surface 622 that interfaces with another compliant guide element 624 separately provided from the guide element 508. In the exemplary embodiment shown, the compliant guide element 624 is provided as a rectangular arm or link that is slidably mounted to the support plate 602 proximate an upper edge of the rectangular portion 610 of the pivot arm 604. The guide element 624 is further biased in position against the rounded engagement surface 622 of the rod eye 618 by a bias element 626 such as a compression spring. The guide element 624, like the guide element 508, is operable in a compliant mode and a rigid mode as explained below.

In the first mode of operation, namely the compliant mode illustrated in FIG. 16, the guide element 624, via the bias element 626, exerts a constant force to establish and maintain surface contact between an end of the guide element 624 and the rounded engagement surface 622 of the rod eye 618 at an interface 628 therebetween. The contact force, which is determined by the spring constant in this example, is strategically selected to maintain the pin 620 and rod eye 618 in a predetermined position relative to the elongated slot 622. As the tool is used, however, the spring 626 and the slot 622 allow the path of the distal end 190 of the demount tool 158 to deviate from an otherwise fixed path of motion. Specifically, when sufficient force "E" is generated to the underside of the demount tool distal end 190, the pivot arm 604 can continue to rotate about the pin 620 as the pin traverses the slot 622 as shown in FIG. 17. Such continued rotation of the pivot arm 604 results in beneficial additional pivoting of the demount tool distal end 190.

As the pin 620 traverses the slot 622, the spring 626 may further compress as necessary and generate additional contact force at the interface 628. The spring may naturally compress and decompress to facilitate clockwise or counterclockwise rotation of the pivot arm 604 about the pin 620 and provide for further variability of the actual working position of the demount tool distal end 190 in use. If the force E continues to increase as the tool is used, eventually the spring may reach its maximum state of compression. The maximum state of compression of the spring 626 can be predetermined to coincide with the pin 620 reaching the end of the slot 622, although this is not necessary in all embodiments. That is, in other contemplated embodiments, the spring 626 may reach its maximum state of compression before or after the pin 622 has fully traversed the slot 620.

When the pin 620 reaches the end of the slot 622, and when the spring 626 is fully compressed, rotation of the pivot arm 604 about the pin 620 in the counterclockwise direction is no longer possible, and the guide element 624 operates as a rigid element as shown in FIG. 18 to overcome the force E. This state is referred to as the rigid mode of operation, and any continued exertion of force by the actuator 606 will apply an increased amount of force at the distal end 190 of the demount tool 158, but the path of the distal end 190 of the demount tool 158 is now fixed. In other words, once the rigid mode of operation is entered, there is no ability of the demount tool distal end 190 to deviate from its path of motion, at least insofar as the guide element 624 is concerned.

It should be noted that the guide element 508, depending on the strategic selection of the bias element therefore, may or may not enter its rigid mode at the same time as the guide element 624. Thus, it may be possible that one of the guide elements 508 and 624 may operate in the rigid mode while the other operates in the compliant mode. Whether or not either of the guide elements 508 and 624 will enter the rigid mode, and specifically when they enter the rigid mode, may vary from tire to tire or wheel rim to wheel rim. The compliant modes and rigid modes will be entered or exited automatically and only as needed in a generally transparent manner to an operator of the machine.

The provision of first and second guide elements 508 and 624 acting on different pivot points for the support plate 602 is believed to provide even further benefits than the tool assembly 500. The first and second guide elements 508, 624 respectively provide a degree of compliance to the demount tool 158 along different axes. The guide element 624 provides compliance in a substantially lateral direction while the guide element 508 provides compliance in a longitudinal direction similar to the previously disclosed embodiments. This laterally directed compliance is beneficial in at least two aspects of tire changing operation as described below.

Firstly, on certain types of wheel rims 106 when the distal end 190 of the demount tool 158 descends into the drop center 203 to extract the tire bead 200, the distal end 190 of the tool 158 can sometimes makes contact with the deepest part of the drop center 203 as shown in FIG. 18. In certain types of wheel rims, such as the rim 106 shown in FIG. 16, there is sometimes a steep sloped wall exiting the drop center. The hooked distal end 190 of the demount tool 158 can strike or collide with the sloped wall and become stuck into the corner between the vertical face of 203 and the steep slope exiting it as shown in FIG. 18. The addition of lateral compliance via the guide element 624 solves this problem by allowing the fluid actuator 606 to realize its full stroke without placing full force on the wheel rim 106 via the collision and wedging action into the corner.

Secondly, during mounting of tires the mount head 160 is used to guide the tire bead 200 onto the wheel rim 106. The bead 200 of the yet un-mounted tire 106 may abut the underside of the tool hook 190. As with several mounting and demounting mechanisms on the market, the underside of the tool hook at the distal end 190 of the tool is an integral part of the tool geometry. The geometry of the underside of the hook acts to guide the tire bead 200 down and into the interior of the wheel rim 106. On occasion, in particular on low aspect ratio and run-flat tires, the abutment of the tire bead 200 and the underside of the hook creates undesirable stress on the tire bead material and also, in some cases, the stress is substantial enough to prevent the 108 tire from being mounted onto the wheel rim 106. By allowing the tire bead 200 to push the tool hook geometry up and out of the way when sufficient force is present, the demount tool assembly 600 can automatically correct this excess stress situation without operator intervention.

III. CONCLUSION

The benefits and advantages of the invention are believed to be amply demonstrated by the exemplary embodiments disclosed.

An embodiment of a tire changer machine for changing a tire on a wheel rim has been disclosed. The machine includes: a base; a drive assembly coupled to the base and configured to rotate a wheel rim and associated tire about a rotational axis; a support tower extending in spaced relation to the drive assembly; and a tool assembly coupled to the support tower. The tool assembly includes: a support extending from the support tower to which the demount tool is mounted; the demount tool having a proximal end and a distal end, the distal end configured to extract a bead of the tire from the wheel rim; and a guide element configured to provide a limited degree of freedom of the distal end from a predetermined path of motion in a tire demount procedure, thereby allowing the distal end to reliably grip the tire bead while the support is maintained in a stationary position relative to the wheel rim.

Optionally, the guide element may be at least partly compliant to provide the limited degree of freedom. The guide element may include a spring loaded link, may include a linear link of variable length, and may be pivotally mounted to the proximal end and pivotally mounted to the support. The guide element may operable in a compliant mode and a rigid mode. The tool assembly may also include a first link and a second link pivotally connected to one another, and may further include a pivot arm, with the guide element further having a shaft interconnecting the pivot arm and the first and second links. A bias element may extend between the first and second links and the pivot arm.

One of the drive assembly and the tool support may be stationary and the other of the drive assembly and the tool support may be movable to adjust a position of the support tower relative to the drive axis. The tool assembly may further include an actuator coupled to the support, wherein the actuator drives the proximal end of the demount tool along the predetermined path of motion, and the guide element accommodates a limited deviation of the proximal end from the predetermined path as the distal end engages the tire. The tool assembly may also include a pivot arm coupled to the support, with the pivot arm connecting the actuator and the proximal end. The tool assembly may also include a wheel mount head mounted stationary to the support, wherein the wheel mount head includes tire mount geometry. The demount tool may be extendable and retractable relative to the wheel mount head. The wheel mount head may define a pocket for the distal end of the tire demount tool, the distal end seated in the pocket when the demount tool is refracted. The pocket may define a guide surface for extending and retracting the demount tool.

The tire changer machine may also include a control system, with the tool assembly being responsive to the control system to demount the tire with the tool assembly in a completely automated manner. The guide element may include an arcuate slot having a first end, a second end, and a variable width between the first end and the second end. The guide element may include a pivot arm having a fixed length. The demount tool may include a first pivot point and a second pivot point, with the first pivot point cooperating with the slot and the second pivot point coupled to the pivot arm.

The guide element may be configured to: provide the limited degree of freedom of the distal end from the predetermined path in a first portion of a path of travel of the distal end in a demount operation; restrict the limited degree of freedom of the distal end in a second portion of a path of travel of the distal end in a demount operation; and allow a limited degree of freedom of the distal end from the predetermined path in a third portion of a path of travel of the distal end in a demount operation. The limited degree of freedom in the first portion of the path of travel and in the third portion of the path of travel may be different from one another.

The guide element may also include a slidable link mounted to the pivot arm. The actuator may include an eye rod, and the slidable link may interface with the eye rod. A bias element may act upon the slidable link.

An exemplary method of changing a tire on a wheel rim utilizing a tire changer machine has also been disclosed. The machine includes a base, a drive assembly coupled to the base and configured to rotate a wheel rim and associated tire about a rotational axis, a support tower extending in spaced relation to the drive assembly, and a tool assembly coupled to the support tower. The tool assembly includes a support, a demount tool coupled to the support and a guide element connecting the support and the demount tool. The method includes: locating the support in a demount position relative to the wheel rim; and while maintaining the support in a stationary position, moving the demount tool along a predetermined path of motion in a tire demount procedure; whereby, as the demount tool is moved, the guide element provides a limited freedom of movement of the demount tool from the predetermined path of motion.

The guide element may include a spring loaded link, and the method may further include resiliently loading the spring loaded link as the demount tool is moved along the predetermined path, whereby the loading of the spring load link directs the demount tool to a position engaging the tire bead that otherwise could not be accommodated by the predetermined path.

The guide element may also include a linear link of variable length, with the method further including loading the spring by compressing the length, and unloading the spring by extending the length, wherein the loading and unloading occurs without user input.

The guide element may be pivotally mounted to the demount tool, and the method may include pivoting the demount tool with the guide element to provide the limited freedom of movement.

The method may further include configuring the guide element so that the guide element resiliently allows the limited degree of freedom in a first operating mode, and provides a reduced degree of freedom in a second operating mode. The reduced degree of freedom may include no degree of freedom. The method may also include configuring the guide element so that guide element resilient allows a limited degree of freedom in a third operating mode, wherein the third degree of freedom is different from the first degree of freedom.

The tool assembly may further include an actuator coupled to a proximal end of the guide element, with the method further including driving the proximal end along the predetermined path with the actuator, and the guide element simultaneously providing a limited deviation of the distal end from the predetermined path as the distal end engages the tire.

The tool assembly may include a pivot arm connecting the actuator and the proximal end, and the method may include operating the actuator to pivot the pivot arm and drive the proximal end along the predetermined path.

The tool assembly may also include a wheel mount head, the demount tool independently operable from the wheel mount head, the demount tool being extendable and retractable relative to the wheel mount head, and the method further including: placing the wheel mount head proximate to the wheel rim; extending the demount tool to engage a tire bead; and retracting the demount tool while engaged to the tire bead. Placing the wheel mount head proximate to the wheel rim may include placing the wheel mount head in contact with the wheel rim.

The wheel mount head may define a pocket for the distal end of the demount tool, and extending the demount tool comprises extending the demount tool from the pocket, and retracting the demount tool, may include seating the demount tool in the pocket.

The machine may include a control system, and moving the demount tool along a predetermined path with the control system may be accomplished in a completely automated manner.

The tool assembly may include a wheel mount head mounted stationary to the support, and locating the support in the demount position may include placing the wheel mount head in physical contact with the wheel rim.

The guide element may include a linear slot having an axial length and a variable width along the axial length, and moving the demount tool may include moving the proximal end of the demount tool along the slot. The tool assembly may also include a pivot arm connecting the actuator and the proximal end, and the method may include operating the actuator drive the proximal end along the slot.

The tool assembly may also include a pivot arm and the guide element includes a first link and a second link coupled to one another at a common pivot point, the pivot arm further connected to the common pivot point and a bias element spanning a distance between the pivot arm and the common pivot point; wherein the method further comprises resiliently loading the bias element to adjust the distance between the pivot arm and the common pivot point as the demount tool is moved along the predetermined path, whereby the loading of the bias element directs the demount tool to a position engaging the tire bead that otherwise could not be accommodated by the predetermined path.

An embodiment of a tire changer machine for changing a tire on a wheel rim has also been disclosed. The machine includes: a base; a drive assembly coupled to the base and configured to rotate a wheel rim and associated tire about a rotational axis; a support tower extending in spaced relation to the drive assembly; and a tool assembly coupled to the support tower. The tool assembly includes: a support movable toward and away from the wheel rim and tire when mounted to the drive assembly; and a demount tool and a wheel mount head coupled to the support, the demount tool selectively positionable relative to the wheel mount head, the demount tool having a distal end, the distal end configured to extract a bead of the tire from the wheel rim as the tire is being demounted; and at least one guide element coupled to the demount tool, the at least one guide element configured to provide a limited degree of freedom of the distal end from an otherwise fixed path of motion in a tire demount procedure, thereby allowing the distal end to deviate from the fixed path. The at least one guide element may include a first guide element and a second guide element, each of the first and second guide elements acting on a different pivot point associated with the pivot arm.

Another embodiment of a tire changer machine for changing a tire on a wheel rim has been disclosed, the machine including: a base; a drive assembly coupled to the base and configured to rotate a wheel rim and associated tire about a rotational axis; a support tower extending in spaced relation to the drive assembly, and; a tool assembly coupled to the support tower. The tool assembly includes: a support movable toward and away from the wheel rim and tire when mounted to the drive assembly; a demount tool coupled to the support, the demount tool selectively positionable relative to the support, the demount tool having a distal end, the distal end configured to extract a bead of the tire from the wheel rim as the tire is being demounted; and at least one guide element associated with the demount tool, the at least one guide element configured to provide a limited degree of freedom of the distal end of the demount tool from an otherwise fixed path of motion in a tire demount procedure. The at least one guide element may include a first guide element and a second guide element, each of the first and second guide elements acting on a different pivot point associated with the pivot arm.

An embodiment of a demount tool assembly for a tire changer machine has also been disclosed including: a support; and a demount tool selectively positionable relative to the support, the demount tool having a proximal end and a distal end, the distal end configured to extract a bead of the tire from a wheel rim; and at least one guide element configured to provide a limited degree of freedom of the distal end from a predetermined path of motion in a tire demount procedure, thereby allowing the distal end to reliably grip the tire bead while the support is maintained in a stationary position relative to the wheel rim. The at least one guide element may include a first guide element and a second guide element, each of the first and second guide elements acting on a different pivot point associated with the pivot arm.

An embodiment of a tire changer machine for changing a tire on a wheel rim has been disclosed, the machine comprising: a base; a drive assembly coupled to the base and configured to rotate a wheel rim and associated tire about a rotational axis; a tool support frame; and a tool assembly coupled to the tool support frame. The tool assembly comprises: a demount tool selectively positionable with respect to the tool support frame, the demount tool having a proximal end and a distal end, the distal end configured to extract a bead of the tire from the wheel rim; and a guide element configured to provide a limited degree of freedom of the distal end from a predetermined path of motion in a tire demount procedure.

An embodiment of a tire changer machine for changing a tire on a wheel rim has been disclosed, the machine comprising: a base; a drive assembly coupled to the base and configured to rotate a wheel rim and associated tire about a rotational axis; a tool support and; a tool assembly coupled to the support, The tool assembly comprises: a demount tool and a wheel mount head, the demount tool selectively positionable relative to the wheel mount head, the demount tool having a distal end, the distal end configured to extract a bead of the tire from the wheel rim as the tire is being demounted; and at least one guide element configured to be compliant in at least one mode of operation, thereby allowing the distal end to deviate from an otherwise fixed path of motion.

An embodiment of a tire changer machine for changing a tire on a wheel rim has been disclosed, the machine comprising: a base; a drive assembly coupled to the base and configured to rotate a wheel rim and associated tire about a rotational axis; a tool support; and a tool assembly coupled to the tool support, the tool assembly comprising: a demount tool selectively positionable relative to the tool support, the demount tool having a distal end, the distal end configured to extract a bead of the tire from the wheel rim as the tire is being demounted; and at least one guide element associated with the demount tool, the guide element configured to operate in at least one compliant mode and at least one rigid mode.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tire changer machine for changing a tire on a wheel rim, the machine comprising:
   a base;
   a drive assembly coupled to the base and configured to rotate a wheel rim and associated tire about a rotational axis;
   a tool support; and
   a tool assembly coupled to the tool support, the tool assembly comprising:
      a demount tool coupled to the tool support and selectively positionable with respect to the tool support, the demount tool having a proximal end and a distal end, the distal end configured to extract a bead of the tire from the wheel rim;
      a pivot arm connecting the tool support and the demount tool, the pivot arm configured to move the proximal end of the demount tool along a predetermined path of motion; and
      a linkage connecting a resilient member between the tool support and a pivot point on the demount tool located between the proximal end and distal end to provide a limited degree of freedom of the distal end of the demount tool from the predetermined path of motion in a tire demount procedure.

2. The tire changer machine of claim 1, wherein the linkage is compliant to provide the limited degree of freedom.

3. The tire changer machine of claim 2, wherein the linkage comprises at least one spring loaded link.

4. The tire changer machine of claim 2, wherein the linkage comprises a linear link of variable length.

5. The tire changer machine of claim 2, wherein the linkage is operable in either a compliant configuration or a rigid configuration.

6. The tire changer machine of claim 1, wherein the tool assembly further comprises an actuator coupled to the tool support, wherein the actuator drives the proximal end of the demount tool along the predetermined path of motion, and the linkage accommodates a limited deviation of the distal end from the predetermined path as the distal end engages the tire.

7. The tire changer machine of claim 6, wherein the pivot arm connects the actuator and the proximal end.

8. The tire changer machine of claim 1, wherein the tool assembly further comprises a wheel head mounted stationary to the tool support, wherein the wheel mount head includes tire mount geometry.

9. The tire changer machine of claim 8, wherein the demount tool is extendable and retractable relative to the wheel mount head.

10. The tire changer machine of claim 1, further comprising a control system, the tool assembly responsive to the control system to demount the tire with the tool assembly in a completely automated manner.

11. A method of changing a tire on a wheel rim utilizing a tire changer machine including a base, a drive assembly coupled to the base and configured to rotate a wheel rim and associated tire about a rotational axis, a support tower extending in spaced relation to the drive assembly, and a tool assembly coupled to the support tower,
   wherein the tool assembly includes a support, a demount tool coupled to the support and having a proximal end and a distal end, a pivot arm connecting the tool support and the demount tool, and a linkage connecting a resilient member between the tool support and a pivot point on the demount tool located between the proximal end and distal end, the method comprising:
   locating the support in a demount position relative to the wheel rim; and
   while maintaining the support in a stationary position, moving the demount tool along a predetermined path of motion in a tire demount procedure;
   whereby, as the demount tool is moved, the pivot arm constrains a proximal end of the demount tool to the predetermined path of motion while the linkage provides a limited freedom of movement of the distal end of the demount tool from the predetermined path of motion.

12. The method of claim 11, wherein the linkage includes a spring loaded link, and the method further comprises resiliently loading the spring loaded link as the demount tool is moved along the predetermined path, whereby the loading of the spring loaded link directs the distal end of the demount tool to a position engaging a bead of the tire that otherwise could not be accommodated by the predetermined path.

13. The method of claim 12, wherein the spring loaded link is a linear link of variable length, and the method further comprises loading the spring loaded link by compressing the length, and unloading the spring loaded link by extending the length, wherein the loading and unloading occurs without user input.

14. The method of claim 11, wherein the linkage is pivotally mounted to the demount tool, and the method comprises pivoting the demount tool with the linkage to provide the limited freedom of movement.

15. The method of claim 11, further comprising configuring the linkage so that the linkage resiliently allows the limited freedom of movement in a first operating mode, and provides a reduced freedom of movement in a second operating mode.

16. The method of claim 15, wherein the reduced freedom comprises no freedom of movement.

17. The method of claim 11, the tool assembly further comprising an actuator coupled to the pivot arm, the method further comprising moving the pivot arm with the actuator to drive the proximal end along the predetermined path, and the linkage simultaneously providing a limited deviation of the distal end from the predetermined path as the distal end engages the tire.

18. The method of claim 11 wherein the tool assembly further comprises a wheel mount head, the demount tool independently operable from the wheel mount head, the demount tool being extendable and retractable relative to the wheel mount head, and the method further comprising:
   placing the wheel mount head proximate to the wheel rim;
   extending the demount tool to engage a tire bead; and
   retracting the demount tool while engaged to the tire bead.

19. The method of claim 18, wherein placing the wheel mount head proximate to the wheel rim comprises placing the wheel mount head in contact with the wheel rim.

20. The method of claim 18, wherein the wheel mount head defines a pocket for the distal end of the demount tool, and wherein extending the demount tool comprises extending the demount tool from the pocket, and retracting the demount tool comprises seating the demount tool in the pocket.

21. The method of claim 11, wherein the tire changer machine includes a control system, and wherein moving the proximal end of the demount tool along a predetermined path comprises moving the proximal end along a predetermined path with the control system in a completely automated manner.

22. The method of claim 11, wherein the tool assembly comprises a wheel mount head mounted stationary to the support, and locating the support in the demount position comprises placing the wheel mount head in physical contact with the wheel rim.

23. A method of changing a tire on a wheel rim utilizing a tire changer machine, the machine including a base, a drive assembly coupled to the base and configured to rotate a wheel rim and associated tire about a rotational axis, a support tower extending in spaced relation to the drive assembly, and a tool assembly coupled to the support tower,
- wherein the tool assembly includes a pivot arm, a support, a demount tool coupled to the support, and a guide element connecting the support and the demount tool,
- wherein the guide element includes a first link and a second link coupled to one another at a common pivot point,
- wherein the pivot arm is connected to the common pivot point, and a bias element spans a distance between the pivot arm and the common pivot point;
- the method comprising:
- locating the support in a demount position relative to the wheel rim;
- while maintaining the support in a stationary position, moving the demount tool along a predetermined path of motion in a tire demount procedure;
- whereby, as the demount tool is moved, the guide element provides a limited freedom of movement of the distal end of the demount tool from the predetermined path of motion; and
- resiliently loading the bias element to adjust the distance between the pivot arm and the common pivot point as the demount tool is moved along the predetermined path, whereby the loading of the bias element directs the demount tool to a position engaging a bead of the tire that otherwise could not be accommodated by the predetermined path.

24. A demount tool assembly for a tire changer machine comprising:
- a support;
- a demount tool coupled to the support and selectively positionable relative to the support, the demount tool having a proximal end and a distal end, the distal end configured to extract a bead of the tire from a wheel rim; and
- a guide element connected to the demount tool, the guide element comprising a linkage connecting a resilient member between the tool support and a pivot point located between the proximal end and distal end, wherein the guide element is configured to constrain movement of the proximal end to a predetermined path of motion and to provide a limited degree of freedom of the distal end from the predetermined path of motion in a tire demount procedure, thereby allowing the distal end to reliably grip the bead of the tire while the support is maintained in a stationary position relative to the wheel rim.

* * * * *